US008402197B2

(12) United States Patent
Brocco et al.

(10) Patent No.: US 8,402,197 B2
(45) Date of Patent: *Mar. 19, 2013

(54) MULTI-PORT SYSTEM AND METHOD FOR ROUTING A DATA ELEMENT WITHIN AN INTERCONNECTION FABRIC

(75) Inventors: Lynne M. Brocco, Cambridge, MA (US); Todd R. Comins, Chelmsford, MA (US); Nathan J. Dohm, Natick, MA (US); David E. Mayhew, Northborough, MA (US); Carey J. McMaster, Stow, MA (US)

(73) Assignee: Jinsalas Solutions, LLC, Dover, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/215,011

(22) Filed: Aug. 22, 2011

(65) Prior Publication Data

US 2012/0131255 A1  May 24, 2012

Related U.S. Application Data

(60) Continuation of application No. 12/643,385, filed on Dec. 21, 2009, now Pat. No. 8,006,024, which is a continuation of application No. 10/945,633, filed on Sep. 21, 2004, now Pat. No. 7,646,760, which is a division of application No. 10/152,656, filed on May 21, 2002, now Pat. No. 6,996,658.

(60) Provisional application No. 60/330,215, filed on Oct. 17, 2001.

(51) Int. Cl.
G06F 13/00 (2006.01)

(52) U.S. Cl. .................................. 710/315; 710/306

(58) Field of Classification Search .................. 710/305, 710/306, 312, 315, 316
See application file for complete search history.

(56) References Cited

U.S. PATENT DOCUMENTS

| 4,740,954 | A | 4/1988 | Cotton et al. |
|---|---|---|---|
| 5,826,048 | A | 10/1998 | Dempsey et al. |
| 6,070,214 | A | 5/2000 | Ahern |
| 6,108,741 | A | 8/2000 | MacLaren et al. |
| 6,115,393 | A | 9/2000 | Engel et al. |
| 6,131,119 | A | 10/2000 | Fukui |
| 6,151,651 | A | 11/2000 | Hewitt et al. |
| 6,160,796 | A | 12/2000 | Zou |
| 6,260,092 | B1 | 7/2001 | Story et al. |
| 6,418,504 | B2 | 7/2002 | Conway et al. |
| 6,446,142 | B1 | 9/2002 | Shima et al. |
| 6,529,963 | B1 | 3/2003 | Fredin et al. |
| 6,556,541 | B1 | 4/2003 | Bare |
| 6,567,876 | B1 | 5/2003 | Stufflebeam |
| 6,636,512 | B1 | 10/2003 | Lorrain et al. |
| 6,646,983 | B1 | 11/2003 | Roy et al. |

(Continued)

FOREIGN PATENT DOCUMENTS

WO  9400937  1/1994

OTHER PUBLICATIONS

"PCI-to-PCI Bridge Architecture Specification," Revision 1.1; PCI Special Interest Group; Dec. 18, 1998; pp. 19-21.

(Continued)

Primary Examiner — Glenn A Auve

(57) ABSTRACT

A method and structure(s) for providing a data path between and among nodes and processing elements within an interconnection fabric are described. More specifically, a device comprising a first circuit configured to couple between a first bus and a link is described. The circuit may be configured to operate as a bridge, support PCI configuration cycles, send outgoing information serially through the link in a format different from that of the first bus, and allow a host processor, communicating through the first bus, to selectively address one or more remote devices to which the device is configured to allow access. In some embodiments, the first circuit may support "spoof-proof" data protocols, and the device may operate in multiple modes including root bridge, leaf bridge, and gateway mode. Multiple addressing models may also be used.

26 Claims, 17 Drawing Sheets

An Edge Node as a Root Bridge

U.S. PATENT DOCUMENTS

| | | |
|---|---|---|
| 6,658,521 B1 | 12/2003 | Biran et al. |
| 6,678,781 B1 | 1/2004 | Domon |
| 6,704,819 B1 | 3/2004 | Chrysanthakopoulos |
| 6,711,647 B1 | 3/2004 | Holehan |
| 6,715,022 B1 | 3/2004 | Ahern |
| 6,728,777 B1 | 4/2004 | Lee et al. |
| 6,910,090 B1 | 6/2005 | Scheel et al. |
| 6,934,283 B1 | 8/2005 | Warner |
| 6,940,814 B1 | 9/2005 | Hoffman |
| 6,963,947 B2 * | 11/2005 | Piatetsky et al. ............. 710/311 |
| 6,996,658 B2 | 2/2006 | Brocco et al. |
| 7,043,541 B1 | 5/2006 | Bechtolsheim et al. |
| 7,062,581 B2 | 6/2006 | Brocco et al. |
| 7,146,452 B2 | 12/2006 | Brocco et al. |
| 8,006,024 B2 * | 8/2011 | Brocco et al. ................ 710/315 |
| 2001/0025329 A1 | 9/2001 | Sheikh et al. |
| 2002/0051445 A1 | 5/2002 | Drottar et al. |
| 2002/0136202 A1 | 9/2002 | Droz et al. |
| 2003/0037199 A1 | 2/2003 | Solomon et al. |
| 2004/0128410 A1 | 7/2004 | Mayhew et al. |
| 2005/0078647 A1 | 4/2005 | Meier et al. |
| 2005/0080976 A1 | 4/2005 | Brocco et al. |
| 2005/0094568 A1 | 5/2005 | Judd |
| 2005/0094630 A1 | 5/2005 | Valdevit |

OTHER PUBLICATIONS

Bob Davis, "AS Design Issues," Network Appliance, Inc., Jan. 5, 2003, 41 pages.

David Mayhew, et al., "PCI Express and Advanced Switching: Evolutionary Path to Building Next Generation Interconnects," 9 pages.

"Advanced Switching for the PCI Express Architecture: the unifying interface for both control and data planes in a converged computing and communications environment," Intel Corp., 2003, 12 pages.

"Advanced Switching Architecture," Intel Developer Forum, Sep. 17, 2003, 52 pages.

Kiran Puranik, Xilinx, "Digging into Advanced Switching Spec," CommsDesign, Apr. 10, 2003, 16 pages.

Official Action issued in U.S. Appl. No. 10/660,188 issued Jun. 11, 2007, 9 pages.

Response to Official Action issued in U.S. Appl. No. 10/660,188 issued Jun. 11, 2007, filed Sep. 12, 2007, 11 pages.

Official Action issued in U.S. Appl. No. 10/660,188 issued Nov. 28, 2007, 10 pages.

Response to Official Action issued in U.S. Appl. No. 10/660,188 issued Nov. 28, 2007, filed Feb. 8, 2008, 12 pages.

Official Action issued in U.S. Appl. No. 10/660,188 issued Mar. 11, 2008, 9 pages.

Response to Official Action issued in U.S. Appl. No. 10/660,188 issued Mar. 11, 2008, filed May 7, 2008, 9 pages.

Official Action issued in U.S. Appl. No. 10/660,188 issued Aug. 6, 2008, 6 pages.

Response to Official Action issued in U.S. Appl. No. 10/660,188 issued Aug. 6, 2008, filed Feb. 5, 2009, 9 pages.

* cited by examiner

Valid Turns Per Input Port

| Input Port | Turn | | | | | | | |
|---|---|---|---|---|---|---|---|---|
| | 0 | 1 | 2 | 3 | 4 | 5 | 6 | 7 |
| 0 | Port 1 | Port 2 | Invalid | Port 4 | Invalid | Invalid | Invalid | Invalid |
| 1 | Port 2 | Invalid | Port 4 | Invalid | Invalid | Invalid | Invalid | Port 0 |
| 2 | Invalid | Port 4 | Invalid | Invalid | Port 0 | Port 1 | Port 0 | Port 1 |
| 4 | Invalid | Invalid | Invalid | Invalid | Port 0 | Port 1 | Port 2 | Invalid |

FIG. 3D

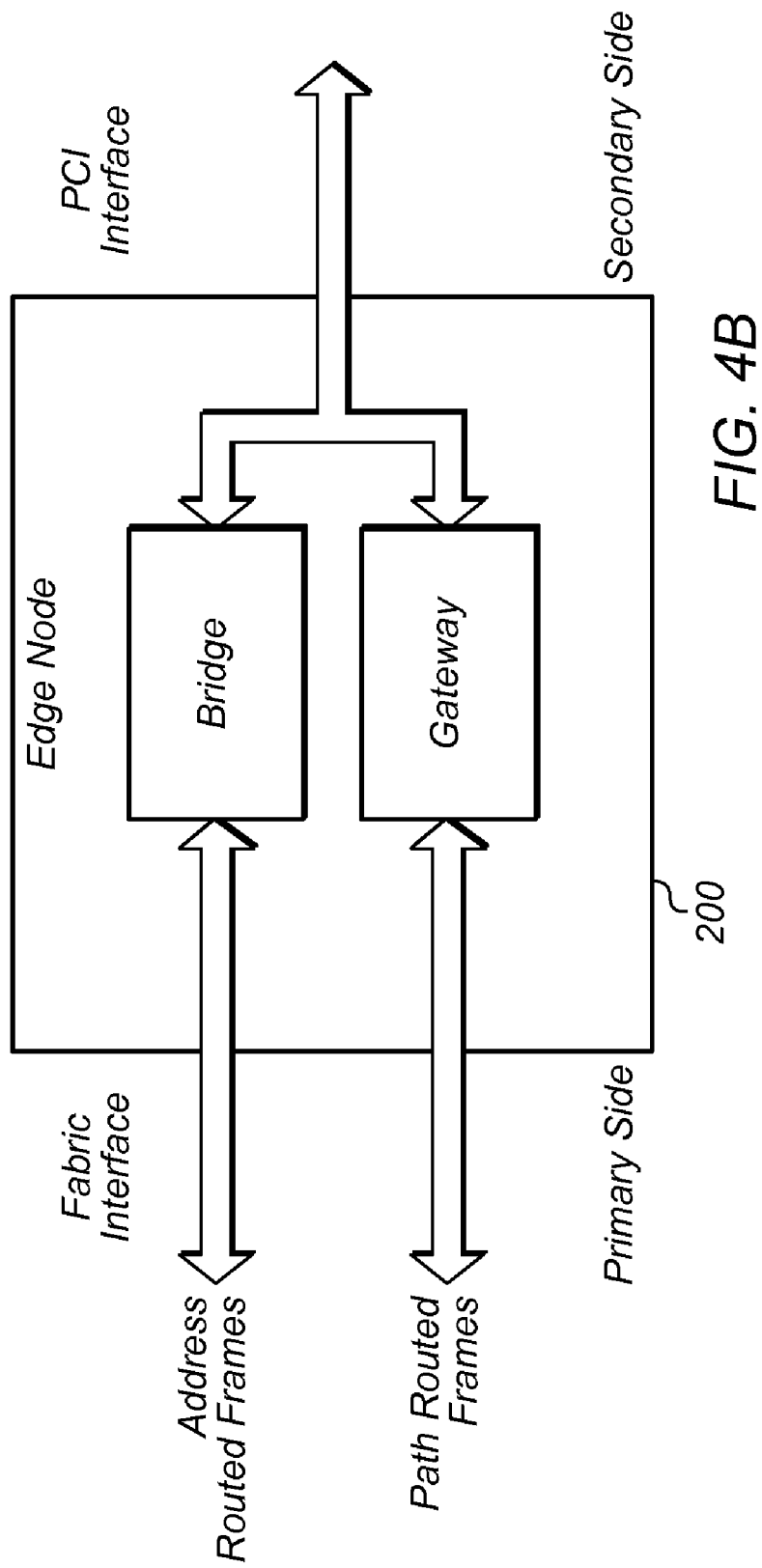

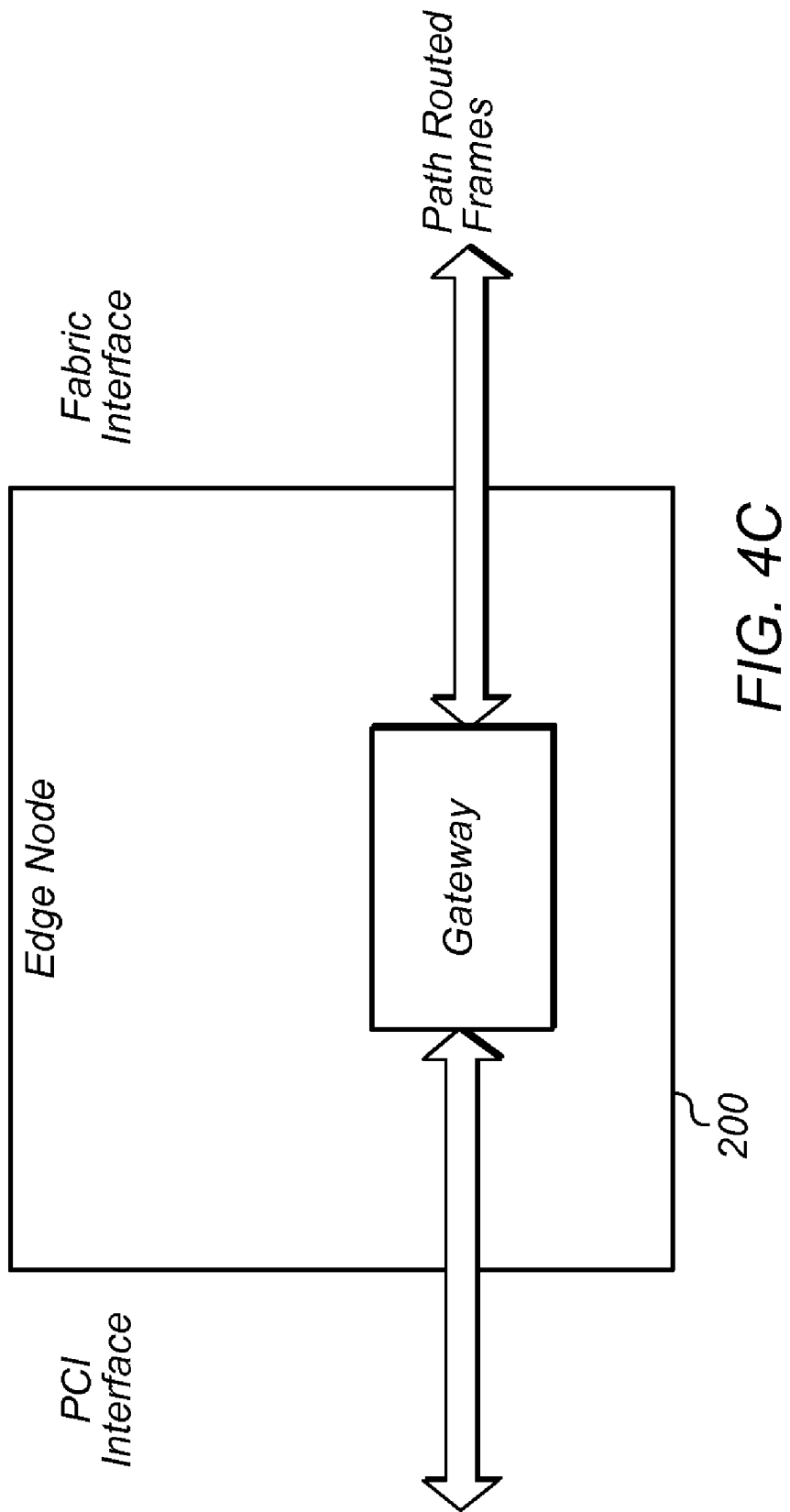

| Frame Components | | | | |
|---|---|---|---|---|
| | Link Overhead | | | |
| Line 0 | Header Byte | Header Byte | Header Byte | Header Byte |
| | Header Byte | Header Byte | Header Byte | Header Byte |
| | Header Byte | Header Byte | Header Byte | Header Byte |
| | Data Byte | Data Byte | Data Byte | Data Byte |
| | Data Byte | Data Byte | Data Byte | Data Byte |
| | Data Byte | Data Byte | Data Byte | Data Byte |
| Line 1 | Data Byte | Data Byte | Data Byte | Data Byte |
| | | Link Overhead | Link Overhead | Link Overhead |

FIG. 5A

Path Routed Write Frame Format

| Dword | 31 30 29 | 28 27 26 | 25 24 23 | 22 21 20 | 19 18 17 | 16 15 14 | 13 12 | 11 10 9 8 | 7 | 6 5 4 | 3 2 1 0 |
|---|---|---|---|---|---|---|---|---|---|---|---|
| 0 | Turn 6 <br> 508 | Turn 5 <br> 507 | Turn 4 <br> 506 | Turn 3 <br> 505 | Turn 2 <br> 504 | Turn 1 <br> 503 | Turn 0 <br> 502 | Turn Count <br> 501 | | CoS | Additional Frame Size |
| 1 | Channel[7:0] | | | Offset[43:32] | | | | Operation | LO | RO | Transaction Number |
| 2 | Offset[31:2] | | | | | | | | | OB | BE1 BE0 1 0 |

610

OB=Orphan Byte
LO=Link Overhead
RO=Relaxed Ordering
BE1=Byte-Enable Qword 1
BE0=Byte-Enable Qword 0

FIG. 5B

Address Routed Write Frame Format

| Dword | 31 30 29 | 28 27 26 | 25 24 23 | 22 21 20 | 19 18 17 | 16 15 14 | 13 12 11 | 10 9 8 | 7 | 6 5 4 | 3 2 | 1 0 |
|---|---|---|---|---|---|---|---|---|---|---|---|---|
| 0 | Turn 6 508 | Turn 5 507 | Turn 4 506 | Turn 3 505 | Turn 2 504 | Turn 1 503 | Turn 0 502 | Turn Count 501 | | CoS | Additional Frame Size | |
| 1 | TR | | | Address[49:32] | | | | Operation | LO | RO | Transaction Number | BB EE 10 |
| 2 | | | | Offset[31:2] | | | | | | | OB | |

610

TR=Target Region
OB=Orphan Byte
LO=Link Overhead
RO=Relaxed Ordering
BE1=Byte-Enable Qword 1
BE0=Byte-Enable Qword 0

FIG. 5C

Configuration Space Snooping Into Port Map Table

*Figure 6-5 Parallel Fabrics*

MULTI-PORT SYSTEM AND METHOD FOR ROUTING A DATA ELEMENT WITHIN AN INTERCONNECTION FABRIC

The present application is a continuation of U.S. application Ser. No. 12/643,385, filed Dec. 21, 2009, which is a continuation of Ser. No. 10/945,633, filed Sep. 21, 2004 (now U.S. Pat. No. 7,646,760), which is a divisional of U.S. application Ser. No. 10/152,656, filed May 21, 2002 (now U.S. Pat. No. 6,996,658), which claims priority to U.S. Provisional Appl. No. 60/330,215, filed Oct. 17, 2001; the disclosures of each of the above-referenced applications are incorporated by reference herein in their entireties.

BACKGROUND OF THE INVENTION

1. Field of Invention

The present invention relates generally to a fabric interconnect system and method for providing a data path between and among nodes and processing elements within an interconnection fabric.

2. Brief Description of the Prior Art

The components inside a computer communicate with each other in various ways. In general, most of the internal system components, including the processor, cache, memory, expansion cards and storage devices, exchange information over one or more "buses".

A bus refers to the physical medium, usually, a wire or a plurality of wires through which data is transmitted from one part of a computer to another. When used in reference to personal computers, the term bus usually refers to internal bus, which connects all the internal computer components to the CPU and main memory.

A computer generally has more than one type of bus. Each bus connects different devices together in order to completely integrate the various parts of the computer. The communication on a bus can be controlled and regulated by a system chipset, which insures that every device in the system is talking properly to every other one by imposing rules that strictly manage the movement of data along the bus. Devices must adhere to a common protocol that specifies the rules for communication between devices. Each device that interfaces to the bus implements a common set of functions. In addition, the system chipset provides functions that are needed for the bus to operate (such as clocks and interrupt controllers). Other devices use, but do not provide, these functions.

A bus is composed of three distinct parts: the data bus the address bus, and the control bus. In some cases the data and address bus can be multiplexed onto the same physical wire. The data bus carries the data being transferred. The address bus carries information about where in memory the data is to be transferred. In the case where one physical wire is used for the data and address bus, a signal pin is used to indicate if data or address information is currently on the bus. The control bus carries meta-data relating to the state of the bus and side-band signals that allow for the orderly management of the system.

In addition, there are a number of devices that control the flow of information on a bus. These devices include switches and bridges. A switch or a bridge is a device that implements rules, known as protocols to regulate the transfer of information across a bus. A protocol is an agreed-upon format for transmitting data between two devices. The protocol can set forth rules for various elements of the information transfer, such as, the type of error checking to be used, the data compression method, if any, how the sending device will indicate that it has finished sending a message, how the receiving device will indicate that it has received a message. A protocol can be implemented either in software or in hardware, such as in a switch or bridge.

Current industry standard communication interconnects (bus standards) are generally of two types: proprietary and generic. Propriety systems are expensive, incompatible with other technology, and tend to populate the high end of the marketplace. Generic systems, based upon industry standards, such as PCI, CompactPCI and H.100/H.110 are constrained in scale and bandwidth, and are usually tuned for one class of traffic. Electrical signaling characteristics, mechanical connections, and spatial locality are additional constraints, as are latency and reliability. The advantage of generic systems is their ability to provide acceptable performance in medium and low-end systems at a very low cost.

Compatibility between devices in generic systems having different protocols can be achieved using devices such as application specific integrated circuits (ASICs), which can incorporate their dedicated data transmission protocols for linking communications between two different industry standard systems. Two types of ASIC devices that are used to achieve compatibility are edge nodes, sometimes referred to as bridges and multi-port switches, sometimes referred to as just switches.

A data bus that connects a plurality of devices is sometimes referred to as an interconnect. An interconnect where devices are connected with many redundant connections or paths between network nodes to make up the communications system within a computer can be generally referred to as a fabric. The geometric arrangement of an interconnect is known as its topology. A protocol will define the set of rules and signals that regulate the flow of data within a fabric in accordance with its topology.

One particular type of protocol that controls data routing across a bus is known as PCI. PCI routing is based on the notions of initiators and targets. The initiator or origin of a transaction is the edge node that generates the initial bus transaction, the terminus of a transaction is the edge node that ultimately receives the transaction. Outside the context of a PCI bus, one way to move data through a network or fabric is known as routing and is the principle function of the devices and protocols that make up a fabric. The routing of data generally takes place by first assembling the data to be transmitted into groups of data corresponding to a particular set of rules. These groups are referred to as packets or frames. The packets or frames are then transmitted from the origin to the terminus using one of the various routing methods. Those methods include, Address Routed Frames or Path Routed Frames. Address routing is, just as its name implies the method of sending data to a particular node, located at a discrete address. Path Routed Frames move across the fabric from the origin to the terminus by "knowing" the relative location of the terminus within the fabric. Paths are strictly relative, comprising something similar to a multi-street intersection for which routing direction may be of the form "skip over three streets in the clockwise direction", which gives rise to a valuable property of Path Routing, that being that it is bi-directional.

However, the routing devices and protocols that exist do not provide the advantages of spoof-proof bi-directionality. Routing is spoof-proof if data arriving at a fabric location can only have come from the location indicated by the data. Routing is bi-directional if the path indicated by arriving data can be transformed into the return path of the source of the data. In addition, there exists a need for a system and method of data transmission in a computer that can provide a high degree of reliability through the use of redundant interconnects, easy device insertion and removal, provide the capability for longer distances between point connections while keeping latency bounded.

Therefore it is an object of the present invention to provide a system and method whereby data packets can be routed over an interconnect fabric using generic protocol and devices, adaptable to transport generic frame data as well as high-level protocols such as IP, ATM and Ethernet.

SUMMARY OF THE INVENTION

In accordance with one aspect of the present invention, there is provided a device accessible by a host processor for expanding access over a first bus to a second bus, the first bus and the second bus each being adapted to separately connect to respective ones of a plurality of bus-compatible devices, each device of which comprises a link, a first circuit adapted to couple between the first bus and the link, and a second circuit adapted to couple between the link and the second bus, the first circuit and the second circuit each being operated as a bridge and being operable to (a) send outgoing information serially through said link in a form different from that of the first bus and the second bus (b) approve an initial exchange between the first bus and the second bus in response to pending bus transactions having a characteristic signifying a destination across a device, and (c) allow the host processor, communicating through the first bus, to individually address different selectable ones of the bus-compatible devices on the second bus: (i) using on the first bus substantially the same type of addressing as is used to access devices on the first bus, and (ii) without first employing a second, intervening one of the bus-compatible devices on the second bus.

The features, aspects, and advantages of the present invention will become better understood with regard to the following description, appended claims, and accompanying drawings.

BRIEF DESCRIPTION OF THE DRAWING(S)

Turning to the drawings:

FIG. 3D is a table that lists the valid and invalid turns for each port in FIG. 2B when it is an input port.

FIG. 4B is a block diagram representing one embodiment of the bridge apparatus of the present invention wherein the Edge Node (Bridge) is functioning as a Leaf Bridge.

FIG. 4C is a block diagram representing one embodiment of the bridge apparatus of the present invention wherein the Edge Node (Bridge) is functioning as a gateway only device.

FIG. 5A is a block diagram representing the structure of a generic data frame for data transmission and control in accordance with the present invention.

FIG. 5B is a diagram representing the structure of the header of a generic path routed frame in accordance with the present invention.

FIG. 5C is a diagram representing the structure of the header of a generic address routed frame in accordance with the present invention. Address

DETAILED DESCRIPTION OF THE INVENTION

In the following detailed description of the embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense. The leading digit(s) of the reference numbers in the Figures usually correspond to the figure number, with the exception that identical components which appear in multiple figures are identified by the same reference numbers.

Overview

Figure 1:
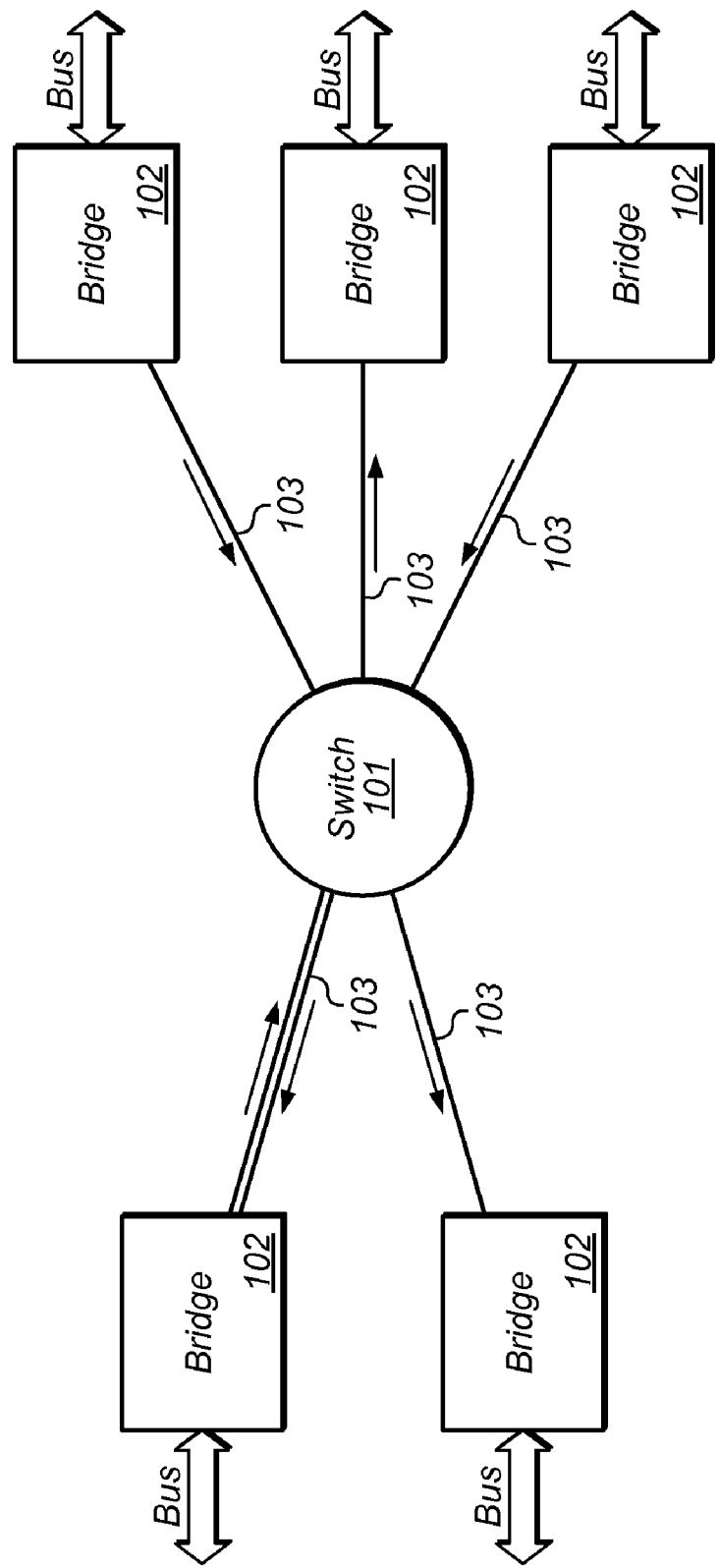
FIG. 1 is a block diagram depicting an exemplary fabric topology of a communication system interconnect embodying a typical application of the present invention.

FIG. 1 is a block diagram depicting an exemplary fabric topology of a communication system interconnect for a typical application of the present invention. The system of the present invention has two different component devices; switches 101, sometimes referred to as stars, and bridges 102, sometimes referred to as edge nodes. Both of these devices are connected by links 103. [bridges and switch in diagram are not labeled] Switches are multi-link and multi-port devices that route traffic from input ports to output ports. Bridges are devices to translate from one protocol into a second protocol. A link is a physical direct point-to point connection between two components. The data transmission protocol of the present invention is a hybrid serial-parallel transmission model in which bytes are transmitted serially across 4 parallel wire-pairs. These 4 independently transmitted bytes are then interleaved to create a single 4-byte wide data word.

The present invention will now be described in detail with reference to the accompanying drawings. While the present invention is described in the context of a network topology and interface utilizing a particular communications protocol, for example, the network is described as utilizing a PCI interface, this is only one example of a communications protocol that can be used. The drawings and description are intended to provide one example of a network configuration in which a system of the present invention may be implemented and are not intended to limit the applicability of the present invention to other network configurations.

Bridge

Figure 2:
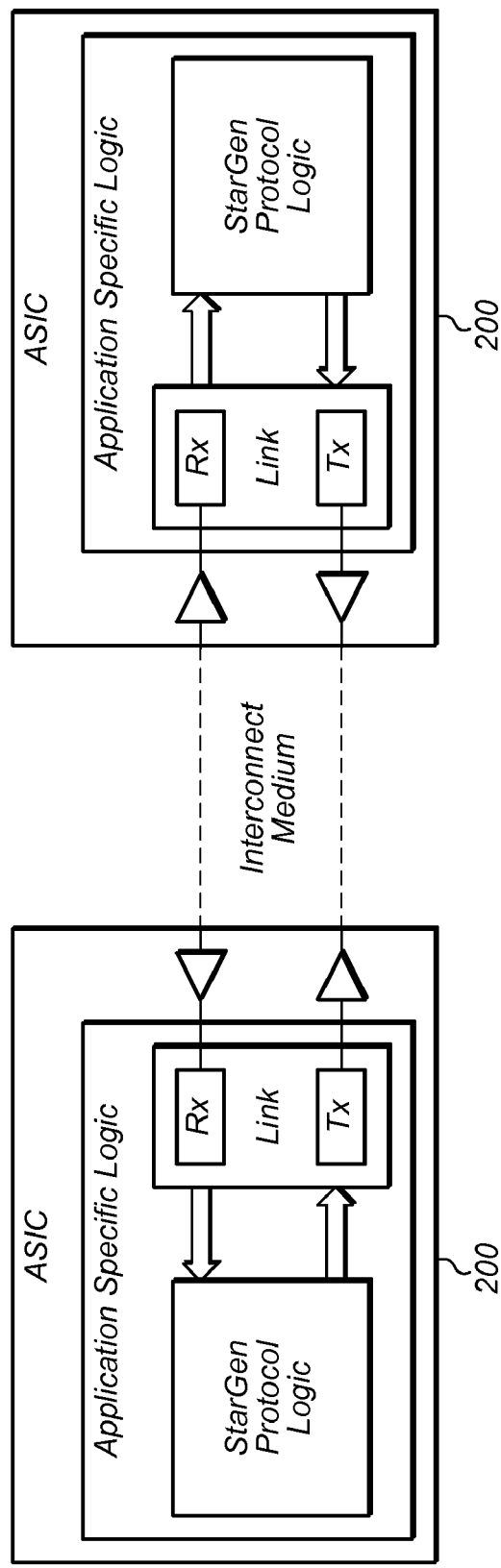
FIG. 2 is a block diagram representing one embodiment of a bridge apparatus constructed in accordance with the present invention.

Referring to FIG. 2, a diagram representing a multi function bridge apparatus 200 constructed in accordance with the present invention is shown. Bridge apparatus 200 translates parallel bus traffic into serial bus traffic.

Bridge apparatus 200 comprises an interface; registers; a transmitter unit or means having a CRC generator, an encoder and a serial converter; a receiver unit or mean having a parallel converter associated with a clock recovery mechanism or means, a decoder, and a CRC-16 checker; and serial links.

The interface can be a 66 MHZ, 64-bit PCI interface. Transmitter unit receives data (formatted frames) to be transmitted in parallel form. As the stream of data moves through the transmitter it attaches a 16-bit cyclic redundancy check (CRC-16) value to the end of each transmitted frame, creating an extended frame. Each byte of the extended frame then passes through an 8B/10B encoder for conversion into 10-bit characters. These 10-bit characters are then converted into a serial stream and transmitted via the link. This stream is DC balanced as a result of the 8B/10B encoding.

In one embodiment, the transmitter is compatible with the TIA/EIA-644 and IEEE 1596.3 LVDS specifications. It delivers data at a 622.08 Mbps rate with a loop current ranging from 2.5 mA to 4.5 mA. The resulting differential voltage produced at the receiver is at least 250 mV and less than 450 mV. On-chip source termination minimizes reflections and this improves signal integrity across backplanes and connectors.

Receiver recovers the clock embedded in the serial data stream and uses it to convert the serial stream into a 10-bit parallel equivalent. The data then passes through an 8B/10B decoder or conversion into eight-bit data bytes. The decoded data stream is then passed through a 16-bit cyclic redundancy check (CRC-16) block. The block compares the CRC-16 value from the transmitter to the CRC-16 value from the receiver. The block then removes CRC-16 data from the data stream.

In one embodiment, the receiver is compatible with the TIA/EIA-644 and IEEE 1596.3 LVDS specifications. An internal 100Ω (nominal) resistor provides the required differential impedance to produce a differential voltage across the receiver. The nominal voltage is ~400 mV with a typical center point at +1.2V. The receiver provides ±100 mV sensitivity over a common-mode range of 0V to 2.4V. The receiver compensates for skew between differential pairs for proper detection. It will not oscillate when inputs are short-circuited or open-circuited. To conserve power, the receiver automatically turns off when a link partner is not connected.

Serial links A and B are designed according to well-known principles. For example, in one embodiment, each link comprises 8 differential pairs. Four pairs transmit and four pairs receive. Each differential pair forms a point-to-point connection between a differential transmitter in one node and a differential receiver in another node. Each point-to-point connection is physically constructed with a pair of balanced, impedance controlled, copper conductors. These conductors can be conventional etch on printed circuit boards (PCB's) or twisted-pair cables.

Bridge Apparatus Logic

The following describes the logic of the bridge apparatus constructed in accordance with the present invention.

In one embodiment of the present invention the bridge apparatus depicted in FIG. 2 operates as a native device. In another embodiment of the present invention, bridge apparatus operates as a translative device. When operating as a native device, bridge apparatus interfaces directly with the Data Transmission Protocol.

When operating as a translative device, bridge apparatus translates one protocol to another, e.g. the data transmission protocol of the present invention to a protocol such as PCI in one embodiment and vice versa. Techniques for translating one protocol to another are well-known in the art. For example, one such technique involves protocol mapping, wherein, an Ethernet-to-Data transmission protocol component could be used to convert Ethernet packets into the Data Transmission Protocol frames. There is no strict translation between the Ethernet and the Data Transmission Protocol, but mapping well known addresses (register assignments) would allow Data Transmission Protocol to interact with the Ethernet. A similar approach could be used with almost any existing protocol.

Addressing

In an embodiment of the present invention, bridge apparatus 200 supports three addressing models—a fabric addressing model and in an exemplary embodiment, a PCI addressing model, although one of ordinary skill in the art could see that alternate addressing models could be implemented using the present invention. In this exemplary embodiment, to support these two addressing models, Bridge apparatus 200 consists of two major functions—a PCI-to-PCI bridge (Bridge) function and a Gateway function. The Bridge function supports the PCI addressing model within the fabric and the Gateway function performs translations between the PCI and fabric addressing models. The Bridge function can be disabled, but the Gateway function is always present.

Address Routing Model

In the exemplary embodiment described herein, the fabric addressing model of the present invention utilizes a path, a channel, and an offset. The Gateway function is the only function in the present invention that uses the fabric addressing model. The Bridge function adheres solely to the PCI addressing model and does not understand fabric addresses. The Gateway function translates between PCI addresses and fabric addresses using the Segment, Path, and Channel Tables.

The Data Transmission Protocol designates destination Channel 255 for register mapping in fabric address space. The Gateway implements a standard set of the Data Transmission Protocol registers, called the Data Transmission Protocol Component Header. These registers are accessible through Channel 255 starting at offset 0. The Gateway's CSRs are also accessible through Channel 255 starting at the boundary (offset 4000 h). Additionally, Bridge and Gateway configuration registers are dual-mapped into Channel 255 address space.

PCI Addressing Model of the Bridge Function

The Bridge function comprises part of a PCI hierarchy in the fabric and performs translations between PCI transactions and The Data Transmission Protocol address-routed frames. In the PCI addressing model, the Gateway function looks like a PCI device on the bus that is the edge node's PCI interface.

In this exemplary embodiment, the Bridge is modeled as a standard, transparent, PCI-to-PCI Bridge. It implements a Type1 configuration header. It forwards PCI configuration, I/O, and memory transactions to downstream devices through the fabric. The bridge function of an edge node operates with the standard PCI plug-and-play initialization code.

The root strapping pin indicates whether the edge node is a root or a leaf, and, as a result, if the PCI bus is primary or secondary. If it is a root bridge, the PCI bus is primary, and downstream transactions flow from PCI to the fabric and upstream transactions flow from the fabric to PCI. In this case, the Bridge's configuration registers are accessible using a Type0 configuration transaction on the PCI bus, and are not accessible from the fabric interface.

If the bridge is a leaf, the PCI bus is secondary, and downstream transactions flow from the fabric to the PCI bus, and upstream transactions flow from the PCI bus to the fabric. The Bridge's configuration registers are only accessible from the link side if a PCI frame is received indicating a Type0 configuration operation. The Bridge converts between PCI transactions and address-routed frames, but the address model remains the same. An address-routed frame is a frame that is directed through the fabric by decoding its address against a set of address ranges at each node (switch or endpoint). The address ranges are defined at each node by the standard PCI-to-PCI bridge base and limit registers.

By default, Bridge functions are fully transparent. This means that every PCI device, including the Gateway, is fully visible to the host and all resources are mapped into the global PCI memory map. Within The Data Transmission Protocol, a local subsystem may have resources that should be hidden from the host. Perhaps a local processor manages these resources, or the resources consume a lot of space in the global address map. When the bridge is a leaf, three mechanisms exist to control access to and from secondary bus devices. In one embodiment of the present invention it is possible to hide Gateway translation address windows BAR2 through BAR5 and hide any or all-secondary bus devices through an IDSEL mask. Finally, it is possible to lock upstream forwarding inside or outside of a programmable window.

PCI Addressing Model of the Gateway Function

In this exemplary embodiment the Gateway is modeled as a PCI device. It has one addressable PCI interface, which always faces the PCI bus. The Gateway translates PCI transactions into either path-routed or multi-cast frames. For path-routed frames, it assigns a set of turns through the fabric to a terminus. Only the initial decode on the PCI bus is necessary.

To translate and forward PCI transactions into the fabric, the Gateway implements a Type0 configuration register space and dual-maps it into CSR space. It also needs help from additional software that initializes the appropriate tables and registers in its CSRs. The software accesses these tables and registers in the Gateway's first two BARs using memory and I/O transactions.

Path Routing Mode

The path routing model of the present invention utilizes a path, a channel, and an offset. The Gateway function is the only function in an edge node that uses the fabric-addressing model. The Bridge function uses the PCI addressing model exclusively. It does not understand. The Data Transmission Protocol fabric addresses. The Gateway function translates between PCI addresses and fabric addresses using the segment, path, and channel tables.

Channel 255 is designated as the destination channel (address space) for device registers. The Gateway function contains a standard set of The Data Transmission Protocol registers, called the Data Transmission Protocol Component Header, that are accessible through channel 255 at offset 0. The Gateway's CSRs are accessible through channel 255 starting at the 16 KByte offset boundary (offset 4000 h). Bridge and Gateway function configuration registers are also dual-mapped into channel 255 space.

Functional Modes

Bridge apparatus 200 may be used in one of three functional modes, that is, multi-function mode, secondary subordinate mode or Gateway-only mode. These modes, are based on whether the Bridge function is enabled or disabled. In the case where the bridge function is enabled, the bridge apparatus 200 can operate in either as a root bridge or a leaf bridge.

Bridge Apparatus as a Root Bridge—Multi-Function Mode

Figure 4A:
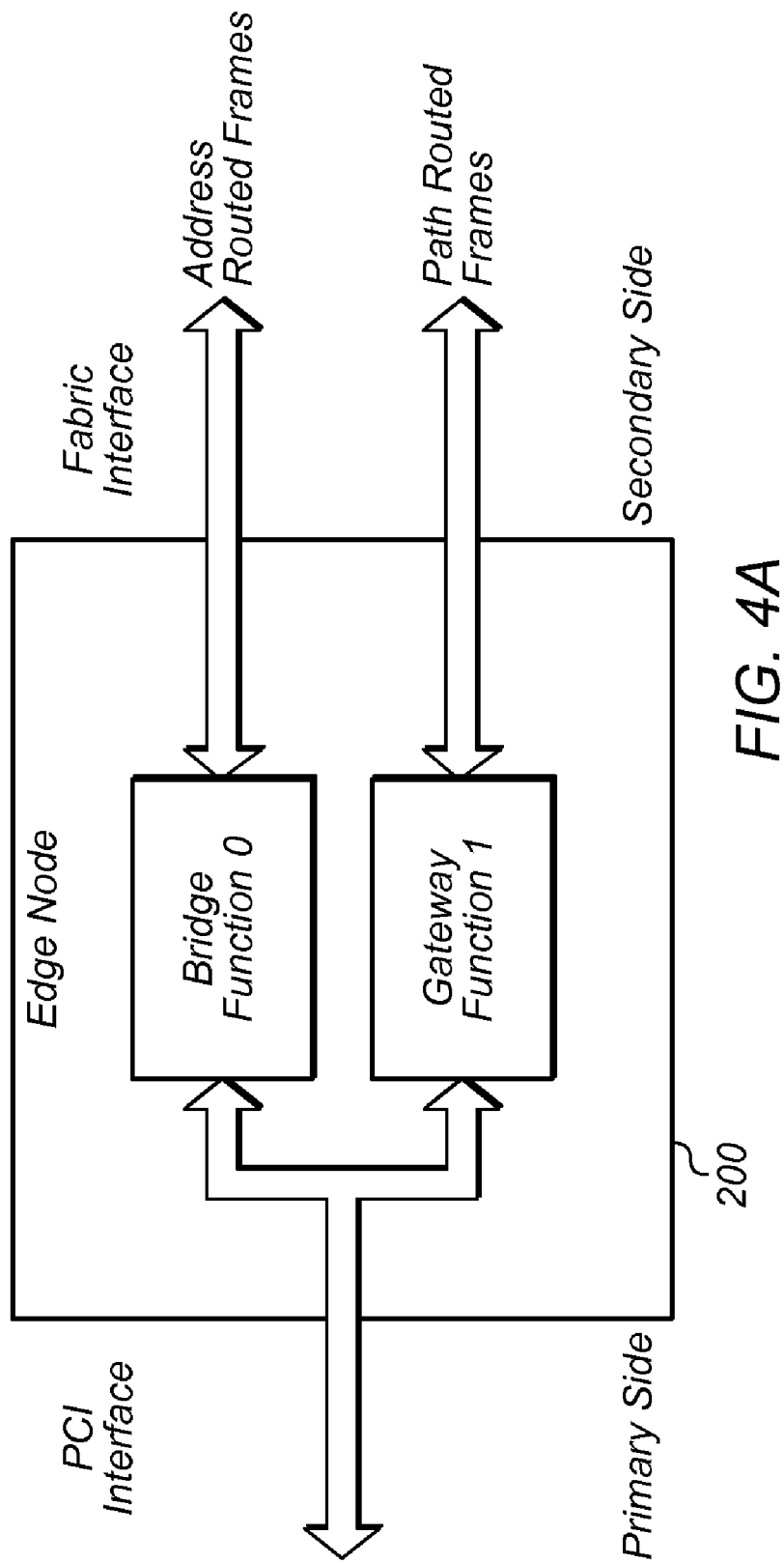
FIG. 4A is a block diagram representing one embodiment of the bridge apparatus of the present invention wherein the Edge Node (Bridge) is functioning as a Root Bridge.

FIG. 4A depicts an embodiment of a bridge apparatus 200 constructed in accordance with the present invention wherein bridge apparatus 200 is operating as a root bridge. As shown, when bridge apparatus 200 is a root, the PCI interface is connected to the primary bus and the fabric interface is connected to and/or represents the secondary bus. In this mode, bridge apparatus 200 is a multi-function device, that is, it operates both the above mentioned gateway and bridge functions. Any access to the bridge function must specify one function and any access to the gateway function must specify another function. For example, in one embodiment, the PCI bus accesses configuration space using a Type0 configuration transaction, but a single IDSEL signal is used. Accesses to the bridge function must specify Function0 and accesses to the gateway function must specify Function1.

Bridge apparatus 200 starts the fabric enumeration process. The root is the most upstream bridge in the fabric's PCI hierarchy. All PCI configuration starts from the PCI bus connected to the root bridge.

Depending on whether or not they are bundled, the serial links connect to one or two downstream nodes.

Bridge Apparatus as a Leaf Bridge—Secondary Subordinate Mode

FIG. 4B is one embodiment of a bridge apparatus 200 constructed in accordance with the present invention wherein the bridge apparatus is operating as a leaf bridge. As a leaf bridge, the PCI interface of bridge apparatus 200 connects to the secondary bus and one of the ports on the fabric interface is the primary bus. In this configuration, the Gateway is a separate PCI device located on the Bridge's secondary bus of the bridge apparatus 200. It is in the same level of hierarchy as the secondary bus devices. This mode is also referred to as secondary subordinate mode.

If the two serial links are also two different ports, then the root port of bridge apparatus 200 is Port0, and the other port (Port1), is not part of the PCI hierarchy (unless the root is attached to a pair of independent fabrics or unless the root is connected in a three bridge ring with a pair of leaf bridges, in which case they can both be part of the PCI heirarchy). However, if the port maps are set up appropriately by software, smart address-routing can use Port1 for upstream transactions by positively decoding against its Port Map table.

By default, the Bridge is fully transparent. Every PCI device downstream of the Bridge, including the Gateway functions of leaf nodes, is fully visible to the host and their resources are mapped into the global PCI memory map.

A local PCI sub-system may have resources that it wishes to hide from the host, either because a local processor manages these resources, or because the resources consume a large amount of space in the global address map. When Aruba is a leaf, three mechanisms are provided to control access to and from secondary bus devices:

Hide Gateway address windows BAR2 through BAR5.

Hide any or all secondary bus devices through an IDSEL mask.

Block upstream memory forwarding inside or outside of a programmable window.

Bridge Apparatus as a Gateway Only Device—Gateway-Only Mode

FIG. 4C depicts an embodiment of a bridge apparatus 200 constructed in accordance with the present invention wherein the bridge apparatus is operating as a gateway only device. Here, the bridge function of multi-function bridge apparatus 200 is disabled. When configured thusly, the PCI bus cannot "see" the disabled bridge function; it sees only the gateway function.

Root bridge function typically creates the PCI hierarchy in the fabric. However, a bridge apparatus 200 configured for gateway-only mode and located at the root will isolate the entire fabric, thereby completely isolating (hiding) any otherwise fabric attached PCI subsystem from the PCI hierarchy.

A root gateway-only device may still start the fabric enumeration process and can also sends PCI transactions through the fabric via path-routed or multi-cast frames.

The following table summarizes the functional modes and properties of each mode.

| MODE | CONFIGURATION | COMMENTS |
| --- | --- | --- |
| Root Bridge (multifunction) | PCI is primary bus Bridge and Gateway provide a multifunction configuration interface to the host. | Only one bridge in the system can be configured as the root. |
| Leaf Bridge (Secondary Subordinate) | PCI is secondary bus. Bridge and Gateway provide a hierarchical configuration model to the host. Gateway is a PCI device on the secondary bus of the Bridge. Enhanced addressing modes can be enabled on the bridge. | Gateway must be able to respond to PCI frames from the fabric addressing BAR0 or BAR1 (CSRs). Gateway BARs have two modes of visibility to the host: All BARs visible Only BAR0 and BAR1 visible |
| Gateway Only | Provides no PCI addressing support into or out of the fabric (a protocol-native device). Provides completely private local addressing support. | All frames translated are path routed frames. |

Address Decoding

What follows is a detailed description of address decoding according to the present invention for the exemplary PCI addressing model in the fabric addressing model.

Operation

In the described embodiment, the multi-function bridge apparatus uses little-endian byte ordering for CRC computation, 8B/10B encoding and decoding, comma detection, and transmit and receive serialization.

Furthermore, the link level transmission protocol uses 8B/10B encoding for all serial data. This coding scheme is widely used within the industry for both Ethernet and Fiber Channel applications. 8B/10B encoding converts every byte of data (eight bits) into a 10-bit code character. Every byte of data consumes 10 bit intervals on the link. The 10-bit 8B/10B code has a 2 10 code space. This code space supports transmission of all 256 possible data byte values as well as a small set of additional special symbols or control codes. The Data Transmission Protocol uses one control code to establish link synchronization. The protocol uses a second control code for propagating maskable resets. It uses a third control code for propagating unmaskable resets. It uses a fourth control code for address routed resets. Finally, it uses a fifth control code for distributing a frame clock.

Encoding/Decoding

Prior to transmission, unencoded data bytes are encoded into coded characters. Encoding or decoding can be accomplished using various means that are well known in the art. These well known methods include, for example 8B/10B, 466 encoding or other psuedo randomization techniques. It should be noted however, that regardless of the encoding/decoding method utilized, any error in encoding under the present invention results in a retransmission.

Data Frames

Data frames are the data carriers of an interconnection fabric. They carry normal read and write data as well as control and error data. The structure of an exemplary data frame that is to be stored and forwarded by a switch constructed in accordance with the present invention is shown in FIG. 5A. Generically, data frames of the present invention are assembled from the components shown in FIG. 5A. These components are the link overhead and header (overhead) and data (payload).

Frames are transmitted with two protocol overhead layers. One layer is in the frame header, which is an internal aspect of the frame, and the other is a lower-level link overhead. Link overhead is typically different every time a frame is transmitted from one component to the next. Link overhead fields are needed to maintain the integrity of the transmission protocol.

Most frame fields convey an essentially fixed set of information from the frame's origin to its terminus. However, link overhead fields serve a link management function, and carry updated link status between link partners along a frame's route, rather than from origin to terminus with the remainder of the frame. Link overhead fields include the: Wire (Buffer) Credit field, which indicates the type and number of wires (Buffer) to be credited back to the sender; the CRC field, which provides a check at the end of the frame to ensure that a frame has been properly transmitted; and a Frame Sequence Number field, which contains two completely independent values which keep frames in order when frames are transported.

Common header fields in accordance with the present invention are as follows. The Additional Frame Size field indicates how many additional (more than one) lines are in the frame. The Channel Number field of a path-routed frame indicates the target destination channel of the write transaction. The Offset field of path routed frames contains a 42-bit relative offset from the indicated channel's base address that is used as the starting address for the associated operation. The Address Field of address routed frames, which subsumes the channel number and offset fields of path routed frames, is a 48-bit quantity that, when combined with bridge resident configuration information, is used to generate standard 32-bit or 64-bit addresses, such as are seen on a PCI bus. The Class of Service field indicates the frame class of service and thereby its priority. The Link Overhead field indicates whether a frame's link overhead is internal or external. The Orphan Byte field indicates, when set, that the associated frame contains an Orphan Byte Count (OBC) byte. An OBC byte indicates the degree of internal frame fragmentation occurring at the end of a frame. The Path field contains the route to be followed by a path-routed frame, or the path followed by an address routed frame, as it migrates from its origin to its terminus. The format of the path specification field for a Path Routed Frame and an Address Routed Frame is depicted in FIGS. 5B and 5C respectively. More specifically, the path specification field contains the route the data frame travel must travel or have traveled as it migrates from its origin to its terminus. The Path specification field comprises one three-bit turn counter field 501 and seven three-bit turn fields 502-507. Collectively, the seven turn fields are referred to as a turn list.

In the path routed data frame depicted in FIG. 5B, the turn counter 501 keeps track of the number of times a frame has been forwarded within the interconnect fabric. Each turn value 502-507 tells the switch how many links/ports an entering data frame should skip, always moving in a clockwise direction, before transmitting the frame. A turn's value can range from 0 through 7 using octal digits. For example, a value of 2 in the turn field indicates that a data frame should skip over two links/ports and exit the switch out of the third link/port. Turn list 610 is, therefore, an array of relative path directions. An active turn list is that portion of the turn list that is actually used to route a frame from the origin to the terminus.

In the address routed data frames depicted in FIG. 5C, the path specification field contains the path completed by the data frame as it travels from the origin to the terminus. The origin sends an empty path specification, i.e. the turn count and all seven turns are set to 0, to the next component (typically a switch). This component then routes the frame based on its address and updates the path specification with the relative port number, turn value, used to forward the frame. To update the path: 1. The turn count is used as an index into the turn list. 2. The relative port number value is placed in the indexed turn. 3. The turn count is incremented.

This effectively tracks the path followed by the data frame and allows the terminus to route responses back to the origin. From an error perspective, the path under construction appears to be the same as any other path. Based on the turn count, the data frame's path can be inverted and reversed to send the frame back to the originator. This path specification field provides the device by which frames can be address routed from origin to terminus and path routed back to the origin from the terminus.

The Relaxed Ordering field is a single-bit field, which indicates whether the frame can be delivered early and out-of-order. The Request Transaction Number field contains the transaction number of the associated requesting frame. The Request Mode field indicates the type of read request. The Target Region field codes the terminus address or target. The Transaction Number field is used in two independent ways, operations that require a response from their target devices make a state entry in the initiating edge node of the operation.

Switch

Figure 3A:
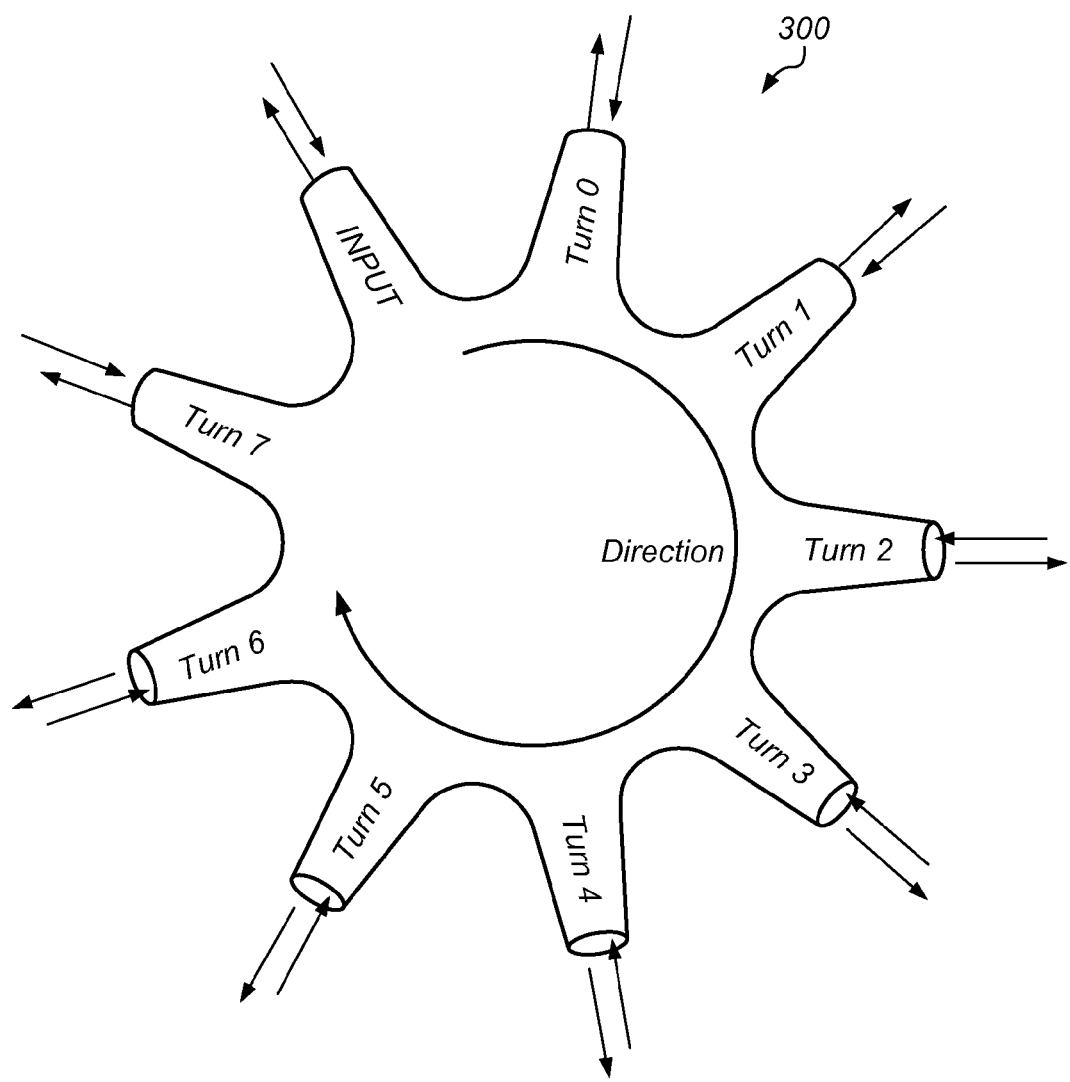
FIG. 3A is a diagram representing one embodiment of a switch apparatus constructed in accordance with the present invention.

FIG. 3A is a diagram depicting an embodiment of a switch constructed in accordance with the present invention. As shown, switch 300 includes a body and a plurality of ports connected therewith, each of which further include a bi-directional data flow link. Furthermore, associated with each port is a turn value, which, as described more fully below, is used for routing purposes. Switch 300 further incorporates hardware and software programming which enables it to simultaneously support three addressing models, a fabric or turn address model, a PCI address model, and a multicast distribution model. When operating in the fabric address model and/or multicast distribution model, switch 300 appears as a switch to configuration software. When operating in the PCI address model, switch 300 appears as a PCI-to-PCI bridge to configuration software.

Switch 300 can be implemented as a store and forward switch although in one embodiment it is possible to implement the present invention in such a manner that the switch does not need to finishing storing a frame before it begins to forward the said same frame. When a data frame arrives at switch 300 through one port, switch 300 examines and updates the data frame's path specification and then forwards the data frame out of the switch through a port different from the port the data frame entered. Whether the ports of a switch are connected to another switch or an edge node/bridge has no effect on the switch; it simply forwards data frames based on the data frame's path specification.

As shown in FIG. 3A, the switch contains nine ports including an input port and the remaining ports labeled with a turn value from 0-7. However, the switch can contain a minimum of 2 ports (some bi-directional links are bundled, others are disabled) up to a maximum of 9 ports or a maximum of 18 links which are bundled to form 9 ports. (one bi-directional link per port).

Figure 3B:
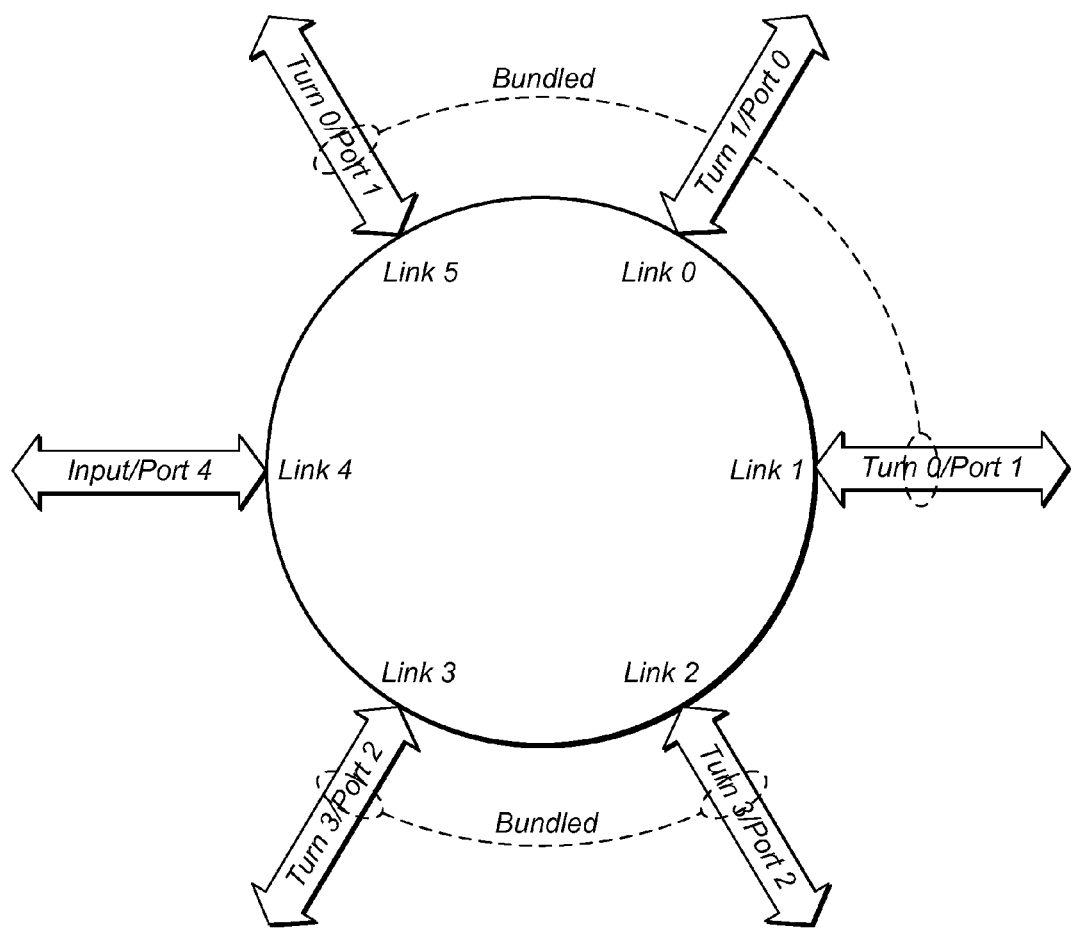
FIGS. 3B and 3C are diagrams that show the relationship between links, ports, and turns in a switch constructed in accordance with the present invention.
Figure 3C:
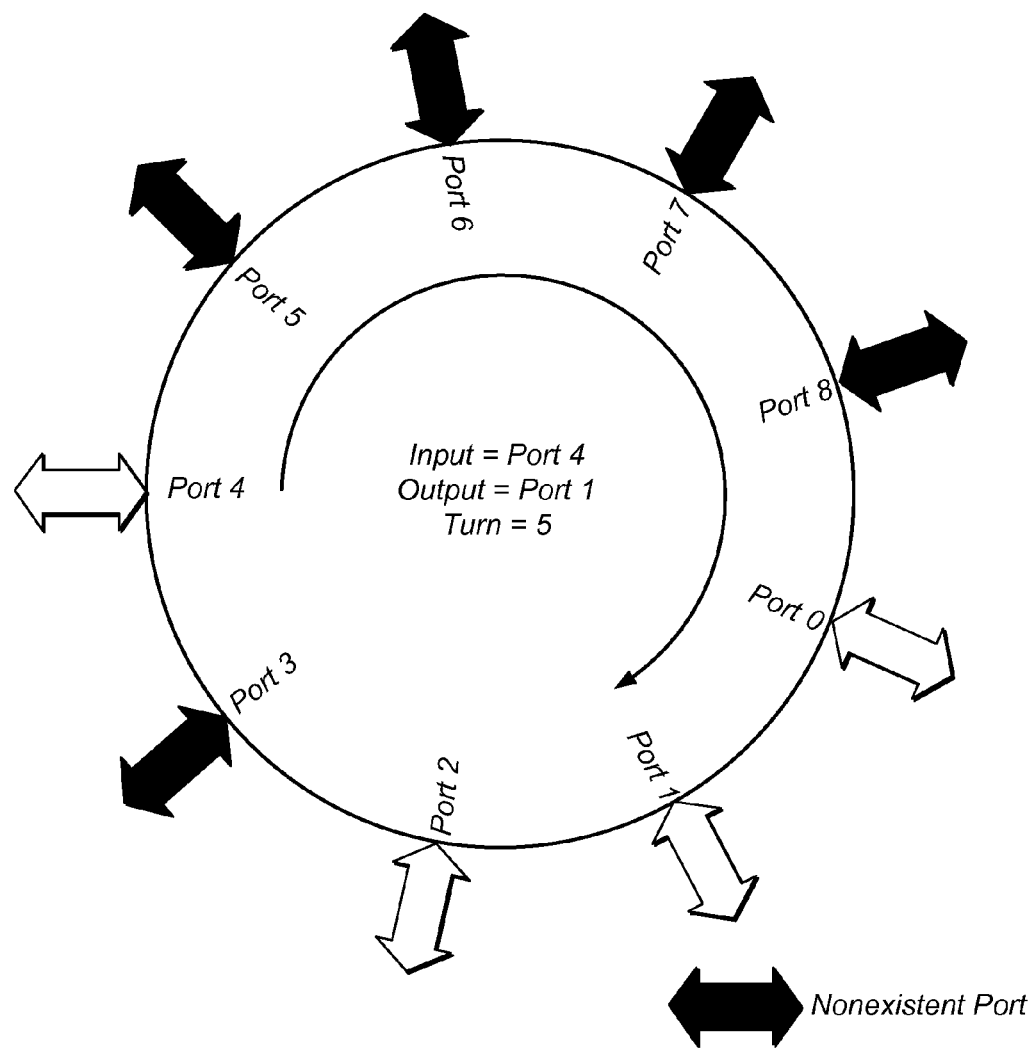

FIGS. 3B and 3C show a diagram depicting an exemplary implementation of the relationship between links, ports, wherein the turns in a switch are configured to have four ports. The relationship described is not meant to be exclusive of other implementations but is descriptive of a particular embodiment. As shown therein, the six links are physically numbered 0-5. When there is only one link per port (unbundled), the port number is the same as the link number. See FIG. 3B. When links/ports are bundled as in FIG. 3B, the port number of each individual port within the bundle is the same and is the port number of the lowest numbered link/port of the bundle. As shown in the example, port 1/link 1 and port 5/link 5 are bundled together and comprises bundled links 1 and 5. Since port 1/link 1 is the lowest numbered link/port in the bundle, port 5/link 5 is now re-labeled port 1/link 5. As further illustration, port 2/link 2 and port 3/link 3 are also bundled together in FIG. 3B. Consequently, since link 2 is the lowest numbered link/port in the bundle, port 3/link 3 is relabeled port 2/link 3.

The actual turn value for a given port will differ depending on the port upon which a data frame enters a switch ("input port"). That is, the turn value is always relative to the input port. As shown in FIG. 3B, when links are unbundled, each port except for the input port will have a valid turn value associated with it. When links are bundled as in FIG. 3B, the turn value that is associated with the lowest numbered link in the bundle is a valid turn value. As shown in FIG. 3B, for example, a data frame enters the switch through port 4/link 4. Moving in a clockwise direction, a turn value of 0 within a turn path specification would route (more on routing later) the input port 4 data frame to port 1/link 5 (formerly, port 5/link 5). A turn value of 1 within a turn path specification would route the input port 4 data frame to port 0/link 0. A turn value of 2 within a turn path specification would route the input port 4 data frame to port 0/link 0. A turn value of 3 within a turn path specification would route an input port 4 data frame to port 1/link 1 and finally, a turn value of 4 within a turn path specification would route the input port 4 data frame to port 2/link 3.

FIG. 3D is a table that lists the valid and invalid turns for each port in FIG. 3C when it is an input port.

Although switch 300 provides for a maximum of six ports having five turn value designations and one input port designation associated therewith, a data frame's path specification is based on all switches having the maximum of nine allowable ports (eight turn value designations and one input port designation.) A path specification that routes a frame to a nonexistent port results in a path error. Exactly which turns are not valid depends on two things, the configuration of the switch (i.e. whether the switch is configured for less than the maximum number of ports) and the input port.

FIG. 3C also shows path routing through a switch with nine ports, when most of the ports are nonexistent (as opposed to having bundled links/ports). As far as the path specification is concerned, the function of the switches is the same. The table of FIG. 3D also lists the valid and invalid turns for each port in FIG. 3C when it is an input port with nonexistent ports.

Switch Routing in Detail

Path Routing

When routing a frame, the origin of the frame knows how many turns the frame will take, but this information is not placed in the frame's path specification. With the exception of frames targeted directly at switches, all frames begin their journey with a turn count of 0. When a routed frame arrives at a switch, the switch uses the turn count to index the turn list. The indexed turn list entry contains the number of ports that the frame should skip clockwise before exiting. After using the turn count to index the turn list, the switch increments the frame's turn count. When a frame finishes its journey, its turn count indicates the number of switches it visited along its path.

The incrementing turn count, a feature of all routed frames 5[?], is the mechanism that prevents frames from entering infinite routing loops. If a frame arrives at switch with a turn count of 7, then a routing error has occurred. Routing errors require the switch detecting the error to build two event frames. One event frame is sent to the node designated to handle routing errors, and the other event frame is sent to the originator of the erroneous frame A path is specified as an octal number with up to seven digits. This path excludes the initial turn taken out of an edge node. This means that an edge node with four ports to four different switches would carry no indication of which port the edge node used to send the frame. The edge node's initial port usage is not necessary to the fabric path.

In one embodiment of a nomenclature for expressing paths, this can be done be enclosing the initial turn in parenthesis. For example, path (2)1357 indicates a four-turn path (turns 1, 3, 5, and 7) that exited its initiator on port 2. It is also sometimes useful to indicate the current position of a frame within its path. This is done with a colon between the last turn taken and the next turn to be taken. For example, route 75:421 indicates a five-turn path, of which only the first two hops have been traversed. Similarly, (1)1234 indicates a four-turn path that is still in its originating edge node, and 123456: indicates a six-turn path that has reached its target. It will be obvious to one skilled in the art that modifications and alterations to this method can be made to achieve the purposes of the present invention.

A path can contain up to seven turns and consumes 24 bits of header space (a seven-entry three-bit turn list and a three-bit turn count). Address routed PCI frames must have the path they traverse within a fabric recorded as they traverse a fabric. Such routes are limited to the same seven-turn limit as any other routed traffic. (The PCI has an inherent 256-bus limit for legacy unrouted configurations and a seven-turn limit does not materially limit the effective span of fabrics with such limited connectivity capabilities.)

Path specifications indicate the number of active turns, but a path specification itself has no such indication within a frame at its origin. From within a frame, the active portion of a path is fully known only when it reaches its target and the turn count can be interrogated. In path specifications that terminate with one or more 0 turns, the terminating 0 turns should not be considered a reasonable indication of path length, because there are almost invariably a reasonable set of valid paths with one or more active, but terminal, 0 turns. Conversely, nonzero turn indices in a path do provide a lower bound on the length of a path. For example, a path turn list of 2435000 indicates at least four turns, and as many as seven turns, if all the 0 turns are active.

Fabric Ennumertion

Overview

Fabric enumeration gives each component in the fabric an identifier. This gives moderate depth to the fabric topology. During enumeration, all components in the fabric are assigned a unique identifier called the fabric ID (FID). The component designated as the root node initiates this unique value assignment.

Topology and Enumeration

This section describes fabric topology building and enumeration. Components that are used to build the fabric are designated as bridge(n), switch(n), or switching-bridge(n), where n is the FID of the component. The root node always assigns itself the root HD. The root node then assigns an FID to each component attached to its links. The link partners in turn assign FID values to their attached components. This process continues until all fabric components are assigned an FID. Because components in the fabric can initially be cross-connected in any number of combinations, they accept FIDs based upon a simple set of predefined rules. A component will accept an FID the FID being offered is lower in value than its current FID. All components initialize their FIDs to the maximum FID.

These simple FID acceptance rules ensure a valid fabric topology generation.

During link synchronization, the root node determines the type of components attached to its links. If the root node finds that none of its link partners are switches (all are bridges), it signals this by assigning edge-node only FIDs to adjacent nodes.

The FID value consists of a parallel fabric number and a path specification. The path consists of a turn count and seven turns, and is the shortest path from the root node upon completion of fabric enumeration. A components FID is stored in a register. During enumeration an FID is evaluated in accordance with the FID acceptance rules, using the syntax: (PFN, Turn Count, Turns) where PFN is the most significant term and the Turns value is always represented as an octal integer. The maximum FID value is: (7,7,7777777), also known as the reset FID (the reset FID is not an illegal FID—it is possible that in a very large fabric a node could be assigned the reset FID as its run-time FID). The smallest FID value is (0,0,R) which is a special representation of an otherwise illegal FID used to specify the root FID.

For example, an FID value where PFN=0, turn count=3, and turns=657, would be evaluated as (0,3,657). Furthermore, as an example of the FID acceptance rules, the FID (0,3,657) is lower in value than the FID (1,2,10).

There are two conditions when the Turn Count is 0:
The root node always gives itself FID (0,0,R
There are no turns; therefore, the Turn Count is 0 and the Turns value is null or unspecified and indicated by N. For example, (0,0,N).

Each component in the fabric must have an FID prior to defining ports. Ports are a logical representation of links. A single port can be a single link or a bundle of multiple links. Links must be categorized as either inactive, bundled, or non bundled to determine their logical correlation to ports. This helps to define the ports available in the component. During fabric enumeration, hardware defines port number and link relationships.

PCI Spanning Tree Generation

An important aspect of the I-Am/You-Are protocol is its ability to generate a spanning tree. A spanning tree is directed, acyclic graph (a well known mathematical concept in the area of graph theory from a root to every node in a fabric. The acyclic nature of this graph requires that some of the links between nodes in the fabric be excluded from the tree. The spanning tree will have one and only one path from each node in the graph to every other node in the graph. The spanning tree can be thought of as superimposed on its associated fabric with some of the links in the fabric active (those that appear in the spanning tree) and some of the links inactive (those not included in the spanning tree).

The I-Am/You-Are protocol results in a parent-child relationship between some nodes and a peer relationship between other nodes. If some node B's FID contains the sub-path of some other node A's FID, then node A is node B's parent (node B is node A's child) and the link between A and B in the fabric will be an active link in the superimposed spanning tree. An FID (X,Y,Z) contains the sub-path of another FID (X',Y',Z') if and only if X=X'; Y=X+1; and the first Y' turns of Z exactly match the first Y' turns of Z'. If a pair of nodes share a common link, but their FIDs do not have a sub-path relationship (parent-child), then the nodes are peers and the link between the nodes is not included in the associate fabric's spanning tree.

The spanning tree is important for two reasons: (1) the spanning tree provides the shortest path from every node the fabric to the root of the fabric; and (2) PCI bus hierarchies are mathematically represented by directed acyclic graphs. Any attempt to superimpose a PCI bus hierarchy on a fabric must be able logically restrict legacy PCI bus transactions to the superimposed spanning tree. The parent/child—peer dichotomy is used to make links transparent and opaque to legacy PCI traffic, and in so doing create the logical view of a tree superimposed on a fabric necessary for the proper operation of PCI.

Bridge Only Fabric

A bridge only fabric contains no switches; the fully connected fabric is made entirely of bridges. In such a fabric, a component FID is assigned using the following method. [FIG. 6A]

1. The root node gives itself FID (0,0,R). It is bridge (0,0,R).
2. Bridge (0,0,R) then generates an FID for its link partners after first scanning all the links to determine if any of its link partners are switch components.
3. Bridge (0,0,R) then sends the FID frame (7,0,N) to the first active link, which is link 0. This link partner has its reset FID of (7,7,7777777), and it accepts the smaller FID (7,0,N). It is now designated as bridge (7,0,N).
4. Bridge (0,0,R) next sends the FID frame to the next link. This informs the link partner on link 1 that its FID is (6,0,N).
5. The link partner on link 1 of bridge (0,0,R) likewise still has its reset FID, and it accepts FID (6,0,N) using the FID acceptance rules described above. It is now designated as bridge (1,0,N).

When only bridges are used in the fabric, each leaf node is a link partner of another leaf node. Accordingly, each leaf node notifies its peer leaf of its, but because leaf nodes never attempt to set the FIDs of their peers, the roots initial You-Are frames are the only You-Are frames ever sent.

Bridge and Switch Fabric

This section describes configurations including both bridges and switches. FIG. 6B is a diagram that depicts a configuration with five bridges (one root node and four leaf nodes) and one switch. The root node assigns each fabric component an FID, enumerated as follows:

1. The root node assigns itself FID (0,0,R).
2. The root node sees the switch component as a link partner and assigns it FID (0,0,N). The switch accepts this FID and starts enumerating its link partners.
3. The switch assigns an FID to each leaf node based on the port through which it connects to that leaf node.
4. Following the FID acceptance rules, all the components in the fabric accept FIDs from the switch because it is the parent link partner. Each component then assigns an FID to all of its link partners. There are three consequences when a component accepts an FID.
   The node that sent the FID becomes the parent.
   The node that accepted the FID becomes the child.
   The port connecting the parent and child is the upstream port (or port 8).

PCI pnp Enumeration

After FID enumeration, the fabric components are ready for software discovery such as:
   Standard PCI pnp BIOS enumeration using address routed configuration scanning, or
   Fabric component discovery using path routed scanning.

This section describes how that occurs in a fabric topology.

PCI legacy software discovers devices using hardware mechanisms designed to generate PCI configuration cycles. PCI devices are required to respond to these configuration cycles. The required response of a PCI device to configuration cycles enables the system to determine that a PCI device exists at that fixed configuration space location. Conversely, if there was no response then a PCI device does not exist at that location. A tree of PCI devices is built using a depth-first scanning algorithm.

Figure 6A:
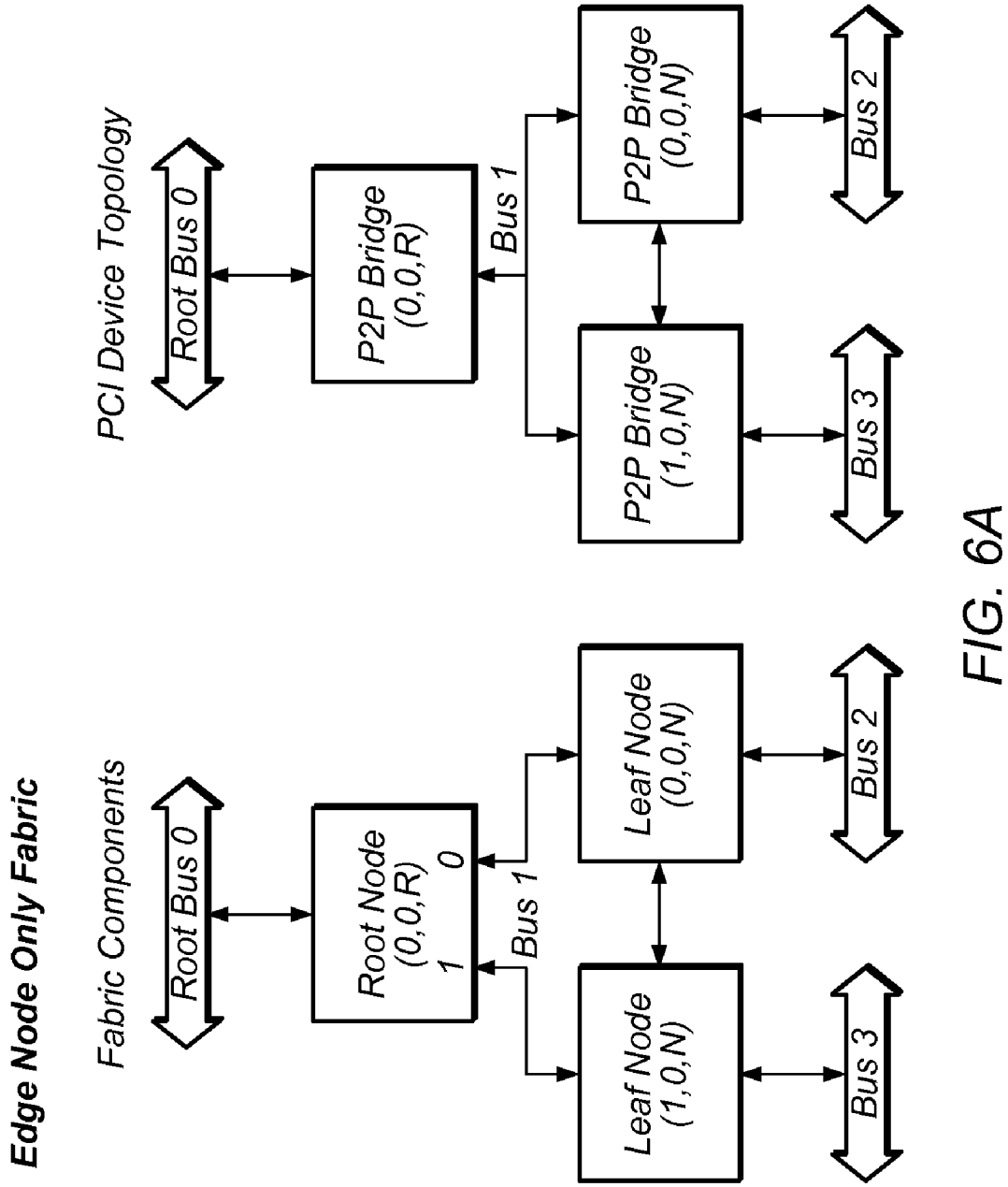
FIG. 6A shows a block diagram of an interconnect configuration in accordance with the present invention having five bridges (one root node and four leaf nodes) and one switch.
Figure 6B:
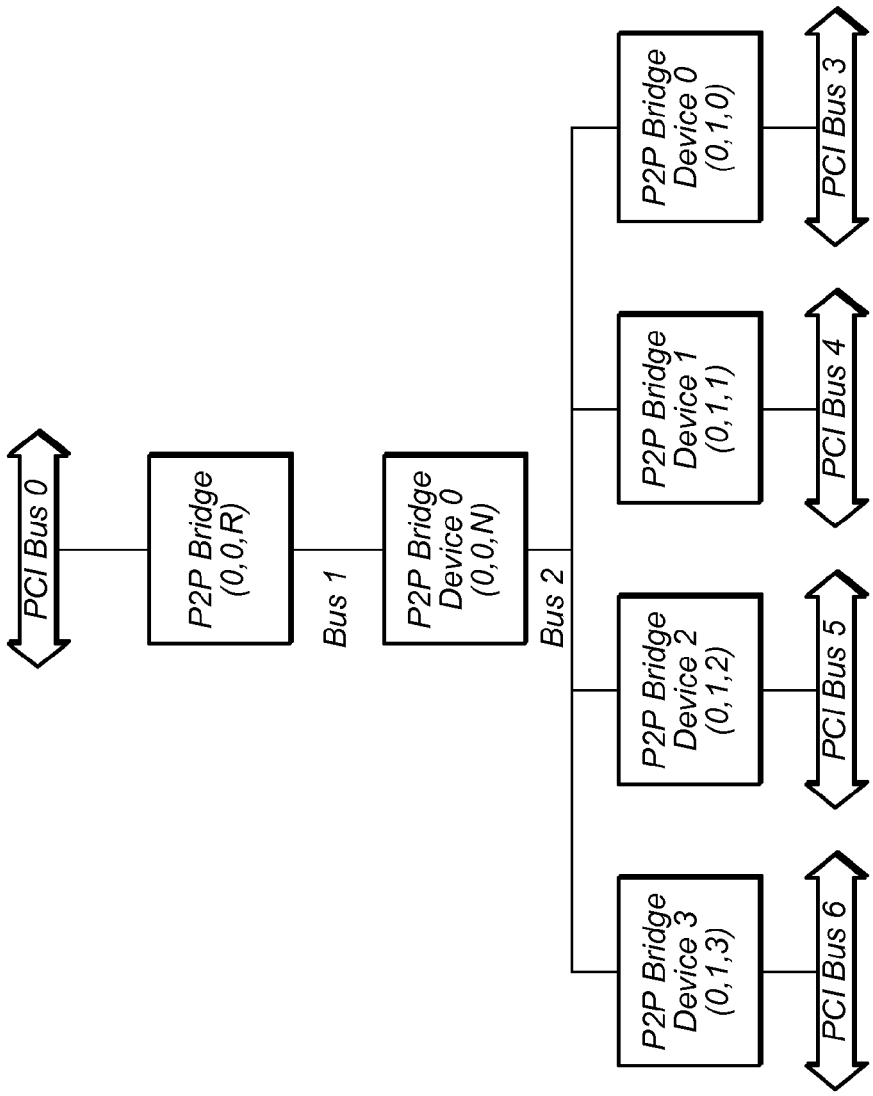
FIG. 6B shows a block diagram of an interconnect configuration in accordance with the present invention.

To standard PCI pnp configuration software, the fabric topology in FIG. 6A appears as shown in FIG. 6B. The fabric appears as a fully compliant PCI topology, because the port that makes a link from the parent node to the child node uses its FID number to define its device number. Specifically, its port number becomes its device number (for example, port 3 is device 3).

PCI pnp Discovery

During pnp discovery, PCI configuration software enumerates the buses. To any PCI legacy enumeration software, a bridge or switch presents itself as if it were a standard PCI-to-PCI (P2P) bridge. FIG. 6B shows an exemplary configuration software diagram wherein the software:

1. Scans bus 0 looking for any PCI device and discovers a device on bus 0 as a PCI-to-PCI bridge (0,0,R). Software then sets its primary bus to 0, its secondary bus to 1, and its subordinate bus temporarily to 0xFF.
2. Starts scanning downstream of P2P bridge (0,0,R) with a type 1 configuration cycle looking at bus 1, device 0, function 0. The port number and the device number are mapped 1:1.
3. Discovers device 0 on bus 1 as P2P bridge (0,0,N). Configuration software sets P2P bridge (0,0,N) primary bus to 1, its secondary bus to 2, and its subordinate bus temporarily to 0xFF.
4. Starts scanning downstream of P2P bridge (0,0,N) with a type 1 configuration cycle looking at all devices on bus 2.
5. Discovers device 0 on bus 2 as P2P bridge (0,1,0). Configuration software sets P2P bridge (0,1,0) primary bus to 2, its secondary bus to 3, and its subordinate bus temporarily to 0xFF.
6. Starts scanning downstream of P2P bridge (0,1,0) with a type 1 configuration cycle looking at all devices on bus 3.
7. Any device on bus 3 responds to these configuration cycles and the resource requests are tallied for later address mapping.
8. After no more P2P bridges are discovered on bus 3, the subordinate bus number in P2P bridge (0,1,0) is set to 3.
9. The PCI software then resumes scanning all functions on bus 2 at device 1.
10. It discovers device 1 on bus 2 as P2P bridge (0,1,1). Configuration software sets its primary bus to 2, its secondary bus to 4, and its subordinate bus temporarily to 0xFF.
11. Starts scanning downstream of P2P bridge (0,1,1) with a type 1 configuration cycle looking at all devices on bus 4.
12. Any device on bus 4 responds to these configuration cycles and the resource requests are tallied for later address mapping.
13. After no more P2P bridges are discovered on bus 4, the subordinate bus number in P2P bridge (0,1,1) is set to 4.
14. Resumes scanning on bus 2 at device 2. This sequence of assigning bus numbers continues until all P2P bridges and PCI devices are discovered from bus 2.
15. After all the P2P bridges are discovered on bus 2, the subordinate bus number in P2P bridge (0,0,N) and P2P bridge (0,0,R) are set to 6 (highest bus number assigned in the topology shown in FIG. 6B).

PCI pnp Resource Allocation

After completing bus enumeration, the system scans all the PCI devices and determines their resource requirements. The system also generates the PCI address paths (base and limit windows) to all the P2P bridge devices. These address windows include I/O space, memory space, and prefetchable memory space.

In accordance with the current invention, each component must snoop each downstream write transaction to any other components connected to its ports. This mechanism allows a parent node to determine the port to which it should send address routed transactions (configuration space, memory space, and I/O space). Each node has a table that stores this PCI configuration write information about each of its ports. This table is called the Port Map Table (PMT).

Within the node, the port from which a specific PCI transaction can exit is based on a PMT entry. By keeping this information, the parent node can precisely determine the port to which it should send address routed transactions. Any configuration space write (byte, short [16 bits], Dword [32 bits]) to the child node's configuration space registers is snooped by the parent and the entry for that child may be used to updated the parent's PMT. The PMT contains a base and limit entry for each port in the node. The hardware generates this table during the pnp phase of topology enumeration and configuration. Table 6-1 shows a typical PMT entry.

After assigning bus numbers to all logical PCI buses, configuration software starts mapping address windows to devices on those buses by tallying previously discovered resource requirements and setting the address windows in each P2P bridge in the path. This is analogous to one side of a PCI-to-PCI bridge, because on that side a transaction is claimed on behalf of an initiator. On the other side it differs, because the transaction can exit any of the fabric ports; and while the switch maintains the logical view of a PCI-to-PCI bridge, i.e. it has one primary and only one secondary interface, the PMT is required to steer the transaction to the correct port and consequently to the correct fabric component of the present invention Each entry in the PMT contains a copy of each child nodes' P2P bridge configuration registers. This table is indexed by using the port number as the offset from the start of the table.

Port Map Table Update Example

Figure 6C:
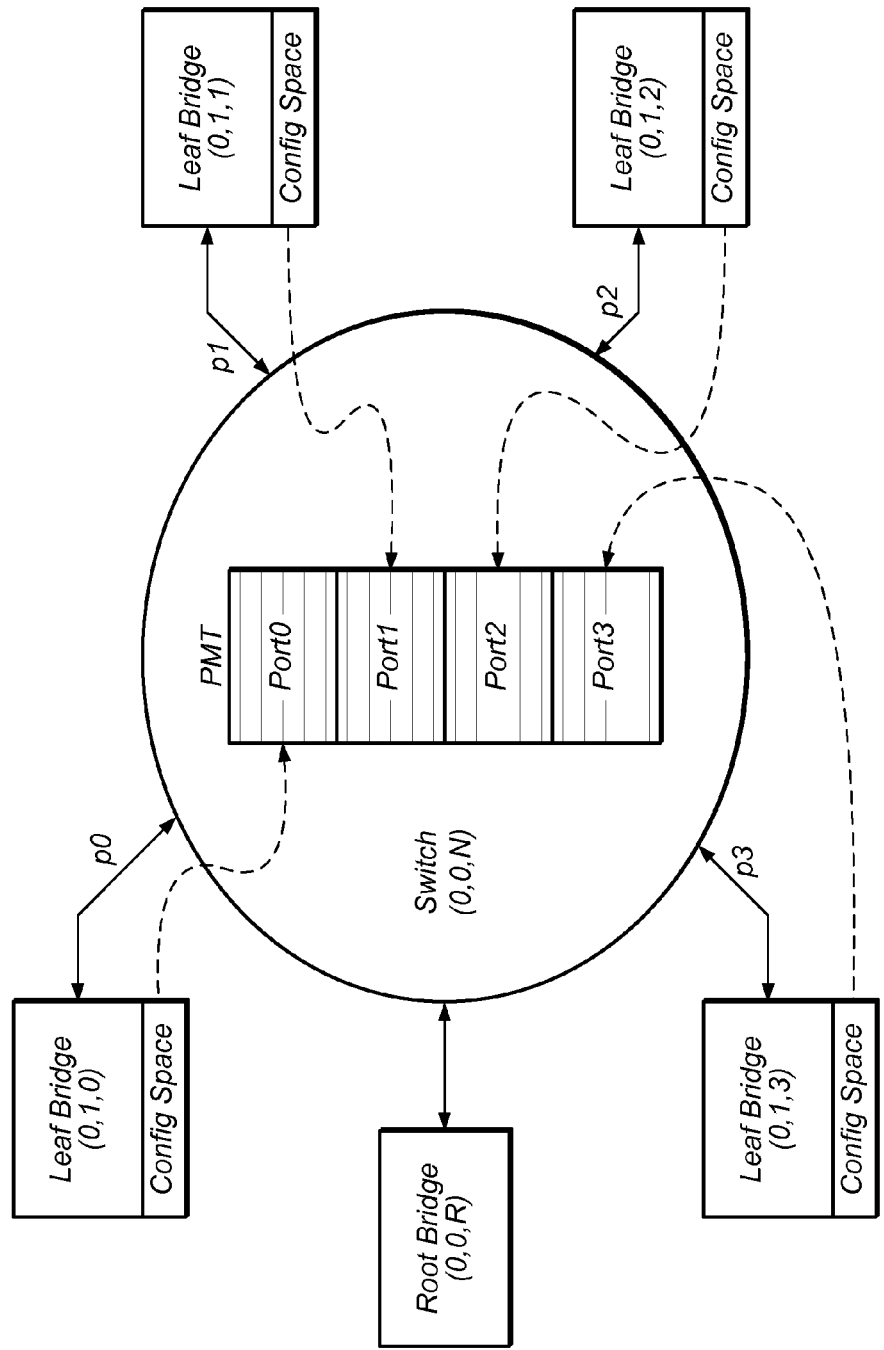
FIG. 6C is a diagram depicting the relationship between configuration registers in accordance with the present invention.

FIG. 6C depicts a diagram showing the relationship between configuration registers and the PMT, where the bridges (root and leaf nodes) and the switch are detected by pnp configuration software as 6 P2P bridges in a PCI legacy topology. As part of the standard PCI enumeration, configuration software assigns bus numbers to P2P bridges prior to memory or I/O allocation. When software assigns bus numbers through normal PCI configuration write cycles, the write is snooped by the parent of the target node. After bus numbers are assigned, the enumerating software scans once again to discover and tally the resource requirements of standard PCI devices (non-node devices). As it scans each bus and assigns each device addresses in I/O and memory space, the software also initializes the base and limit registers of P2P bridges to reflect the resources assigned on that bus. All downstream configuration space writes, including base, limit, and command register are snooped by the parent for entry into its Port Map Table.

Fabric Node Discovery

The Data Transmission Protocol has a non-PCI mechanism that identifies fabric components. Fabric node discovery software builds a graph, or connection list, of all nodes in the fabric. Fabric discovery then determines the shortest path between bridges by using the FED assigned to the node. The shortest path is the path with the fewest turns. When a path already exists and then a shorter path is found during discovery, the shorter path is used and the longer path becomes an alternate path Using the shortest path is always more favorable in building the bridge relationships. Alternate paths can be used if the shortest path becomes unavailable.

Fabric Node Paths

Software can be used to establish PCI memory space mapped connections between bridges in a fabric. Starting at some given bridge, software interrogates its port state table to determine all of its active ports (ports that are connected to other nodes). It then steps over to its neighboring nodes and repeats the process, checking the FID of its neighbor and the set of active ports on its neighbor. It then steps to its neighbor's neighbors, and so forth until all the nodes in a fabric have been interrogated. The scanning algorithm used first to identify the graph relationship of nodes can be either depth first or breadth. The software uses a node's FID value to determine whether the node has already been encountered by the discovery software, and after constructing a software graph analogue of the fabric, the shortest path from any given node to any other given node can be determined, using any number of well-known shortest path graph search. Software can then be used to initialize a bridge's path and segment tables using this shortest path information.

Parallel Fabric Enumeration

Figure 6D:
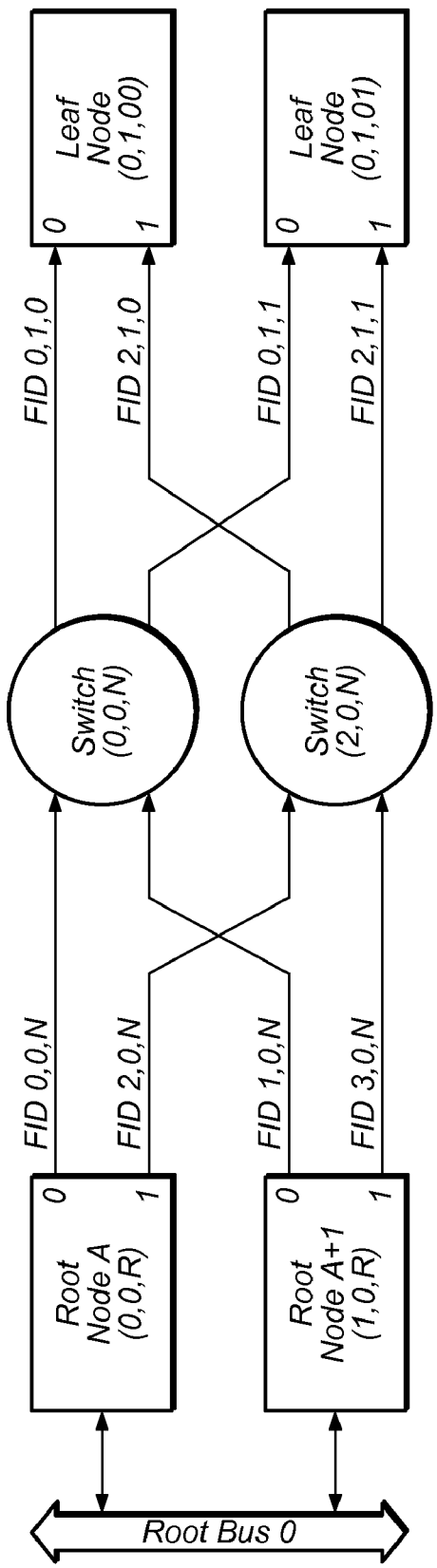
FIG. 6D is a diagram depicting a simple parallel fabric configuration in accordance with the present invention.
Figure 7:
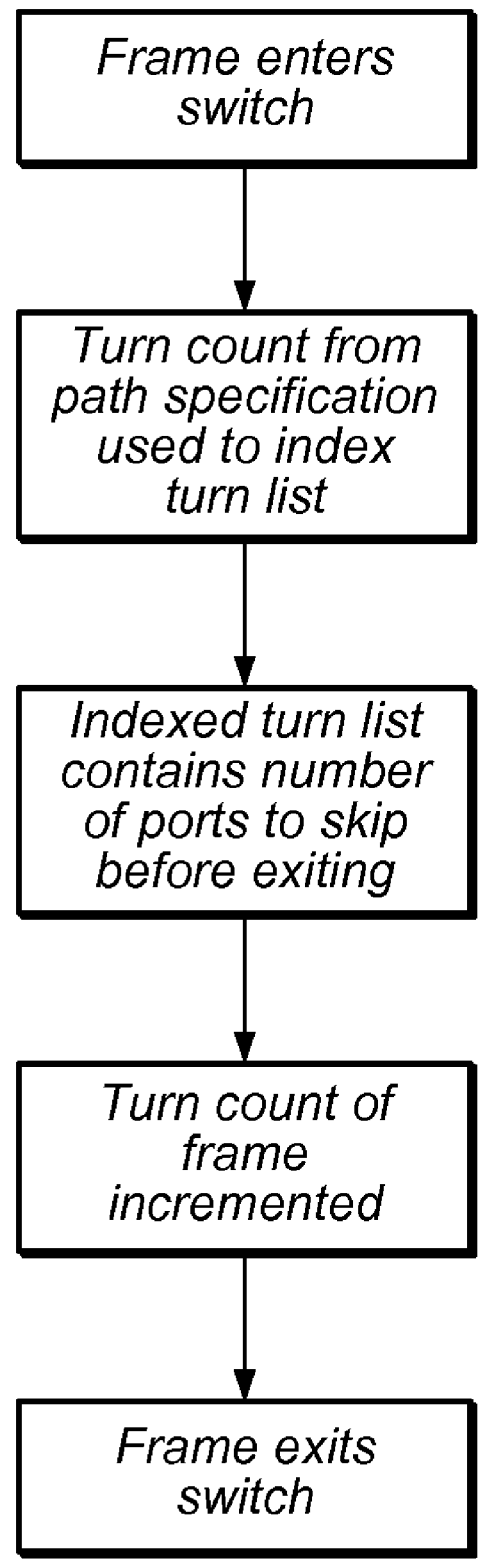

A parallel fabric is one in which leaf bridges are connected to each other and to their root bridges via two or more disjoint fabrics. Two fabrics A and B are disjoint if and only if: there exists a switch only path from each switch in A to every other switches in A, there exist a switch only path from each switch in B and every other switch in B, and there are no switch only paths from any switch in A to any switch in B. A switch only path is one that includes no bridges FIG. 6D depicts a diagram showing a simple parallel fabric configuration.

The root bridge of The Data Transmission Protocol fabric is identified by either a hardware strapping pin that identifies a bridge device as the root, or a software mechanism that configures an bridge as the root. In a parallel fabric such as shown in FIG. 6D, the strapping pins are configured for legacy PCI discovery such that the pin for root node A is de-asserted and the pin for root node A+1 is asserted. The pins correspond to bit 0 of the PFN; consequently, using the syntax (PFN,Turn Count, Turns), root node A assigns itself FID (0,0,R) and root node A+2 assigns itself FID (2,0,R). Following the sequence given in the section of this description concerning Bridge and Switch Fabric, each root node attempts to assign an FID to the fabric components, but according to the FID acceptance rules, only root node A succeeds because the FIDs root node A offers to switches are lower in value than the FIDs offered by root node A+2.

Having now described one or more embodiments of the invention, it should be apparent to those skilled in the art that the foregoing is illustrative only and not limiting, having been presented by way of example only. All the features disclosed in this specification (including any accompanying claims, abstract, and drawings) may be replaced by alternative features serving the same purpose, equivalents or similar purpose, unless expressly stated otherwise. Therefore, numerous other embodiments of the modifications thereof are contemplated as falling within the scope of the present invention.

What is claimed is:

1. A device, comprising:
a first circuit configured to couple between a first bus and a link;
wherein the device is configured to allow access by a host processor to a remote device;
wherein the first circuit is configured to operate as a bridge, support PCI Type 0 and Type 1 configuration cycles, send outgoing information serially through the link in a format different from a format supported by the first bus, and allow the host processor to selectively address the remote device by communicating through the first bus.

2. The device of claim 1, wherein the first circuit is configured to transport data from the host processor to the remote device according to a first protocol, wherein data transported by the first circuit and arriving at the remote device in accordance with the first protocol is guaranteed to have been provided by a source indicated by the first protocol.

3. The device of claim 2, wherein the first protocol is a turn-based protocol.

4. The device of claim 1, wherein the device is configured to receive address information from the host processor that assigns a unique address range to the remote device; and
wherein the first circuit comprises a storage element configured to store the received address information.

5. The device of claim 4, wherein the received address information is included as part of at least one of a PCI Type 0 configuration cycle and a PCI Type 1 configuration cycle.

6. The device of claim 1, wherein the device comprises a receiver unit configured to decode clock values embedded in a serial data stream.

7. The device of claim 1, wherein the link is configured to couple to a switch, and wherein the device is configured to convert between data in a bus format and data in a network format with which the switch is compatible.

8. The device of claim 1, wherein the device is configured to operate in a root bridge mode, a leaf bridge mode, and a gateway mode.

9. The device of claim 1, wherein the device is configured to convert Ethernet packets into Data Transmission Protocol frames using address mapping.

10. The device of claim 1, wherein the device is configured to provide the outgoing information to a serial bus.

11. The device of claim 1, wherein the first bus is a parallel bus.

12. The device of claim 1, wherein a format of the outgoing information includes serial data and the format supported by the first bus includes parallel data.

13. The device of claim 1, wherein the first bus is a kind of PCI bus.

14. The device of claim 1, wherein the device further comprises a second circuit configured to couple between the link and a second bus, wherein the remote device is configured to couple to the second bus, wherein the second circuit is configured to operate as a bridge and is configured to support PCI Type 0 and Type 1 configuration cycles.

15. A system, comprising:
a fabric including one or more switches, wherein a first switch of the one or more switches has a plurality of ports; and
a first circuit configured to couple between a first port of the first switch and a first bus; wherein the first circuit is configured to operate as a bridge, support PCI Type 0 and Type 1 configuration cycles, send information via the fabric in a format different from a format supported by the first bus, and allow a host processor to selectively address a remote device via the bus.

16. The system of claim 15, wherein in a first mode of at least two modes, the first circuit is configured to convert communications received in a first format to either one of a second and a third format, and to convert communications received in either one of the second and third formats to the first format.

17. The system of claim 16, wherein in a second of the at least two modes, the first circuit is configured to convert communications received in the first format to the second format but not the third format, and to convert communications received in the second format to the first format, but not convert communications received in the third format to the first format.

18. The system of claim 15, wherein the first circuit is configured to transport data from the host processor to the remote device according to a first protocol, wherein data transported by the first circuit and arriving at the remote device in accordance with the first protocol is guaranteed to have been provided by a source indicated by the first protocol.

19. The system of claim 18, wherein the first protocol is a turn-based routing protocol.

20. The system of claim 15, wherein a device including the first circuit includes one or more configuration registers, is configured as operate in a root bridge mode or a leaf bridge mode, and is configured to convert network packets into bus packets using address mapping;
wherein the device including the first circuit includes a plurality of different mechanisms to control access to and from secondary bus devices during operation in leaf bridge mode.

21. The system of claim 15, wherein a device including the first circuit is configured to operate in a root bridge mode, a leaf bridge mode, and a gateway mode.

22. A switch, comprising:
a plurality of ports; and
a first storage element configured to implement a PCI configuration space;
wherein the switch is configured to couple between a first circuit and a remote device, wherein the first circuit is configured to communicate with a host processor coupled to a first bus, operate as a bridge, support PCI Type 0 and Type 1 configuration cycles, and send outgoing information in a format different from a format supported by the first bus;
wherein the remote device is configured to respond to PCI configuration cycles originating from the processor; and
wherein the switch is configured to respond to the PCI configuration cycles originating from the processor, operate as a bridge, support PCI Type 0 and Type 1 configuration cycles, and perform address translation on packets received via the plurality of ports.

23. The switch of claim 22, wherein the switch is configured to support three or more addressing models, and wherein the switch is configured to appear as a PCI-to-PCI bridge to configuration software in a first of the three or more addressing models.

24. The switch of claim 22, wherein each of the plurality of ports of the switch is associated with a corresponding one of a plurality of turn values.

25. The switch of claim 22, wherein the switch is configured to alter path specifications for packets received via the plurality of ports.

26. The switch of claim 22, wherein the switch is configured to couple to a second circuit, wherein the second circuit is configured to couple to a second bus, operate as a bridge and support PCI Type 0 and Type 1 configuration cycles.

* * * * *

UNITED STATES PATENT AND TRADEMARK OFFICE
CERTIFICATE OF CORRECTION

| | | |
|---|---|---|
| PATENT NO. | : 8,402,197 B2 | Page 1 of 1 |
| APPLICATION NO. | : 13/215011 | |
| DATED | : March 19, 2013 | |
| INVENTOR(S) | : Brocco et al. | |

It is certified that error appears in the above-identified patent and that said Letters Patent is hereby corrected as shown below:

On the Title Page, in Column 1, under "Related U.S. Application Data", delete item "(60)" and insert item -- (63) --, therefor.

In the Specification

In Column 1, Line 4, insert -- CROSS REFERENCE TO RELATED APPLICATIONS --.

In Column 4, Line 6, delete "invention. Address" and insert -- invention. --, therefor.

In Column 8, Line 37, delete "heirarchy)." and insert -- hierarchy). --, therefor.

In Column 13, Line 12, delete "frame" and insert -- frame. --, therefor.

In Column 13, Line 55, delete "Ennumertion" and insert -- Enumeration --, therefor.

In Column 14, Line 1, delete "HD." and insert -- FID. --, therefor.

In Column 14, Line 37, delete "(0,0,R" and insert -- (0,0,R). --, therefor.

In Column 17, Line 64, delete "FED" and insert -- FID --, therefor.

Signed and Sealed this
Fifth Day of August, 2014

Michelle K. Lee
*Deputy Director of the United States Patent and Trademark Office*